US012290772B2

(12) United States Patent
Janikowski et al.

(10) Patent No.: US 12,290,772 B2
(45) Date of Patent: May 6, 2025

(54) COMPOSITE FILTER MEDIA WITH MULTIPLE FIBER STRUCTURES INCLUDING NANOFIBERS

(71) Applicant: Cummins Filtration IP, Inc., Columbus, IN (US)

(72) Inventors: Eric A. Janikowski, Jefferson, WI (US); Huanling Liu, Cookeville, TN (US); Christopher E. Holm, Madison, WI (US); Mark T. Wieczorek, Cookeville, TN (US); Barry Mark Verdegan, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 413 days.

(21) Appl. No.: 17/051,498

(22) PCT Filed: Apr. 30, 2019

(86) PCT No.: PCT/US2019/029955
§ 371 (c)(1),
(2) Date: Oct. 29, 2020

(87) PCT Pub. No.: WO2019/213107
PCT Pub. Date: Nov. 7, 2019

(65) Prior Publication Data
US 2021/0170317 A1    Jun. 10, 2021

Related U.S. Application Data

(60) Provisional application No. 62/666,315, filed on May 3, 2018.

(51) Int. Cl.
*B01D 27/00* (2006.01)
*B01D 39/16* (2006.01)
(Continued)

(52) U.S. Cl.
CPC ..... *B01D 39/2017* (2013.01); *B01D 39/1623* (2013.01); *B01D 2239/025* (2013.01);
(Continued)

(58) Field of Classification Search
CPC ........ B01D 27/00; B01D 27/04; B01D 39/00; B01D 39/08; B01D 39/083; B01D 39/14;
(Continued)

(56) References Cited

U.S. PATENT DOCUMENTS 4,032,457 A    6/1977  Matchett
5,762,670 A    6/1998  Kahlbaugh et al.
(Continued)

FOREIGN PATENT DOCUMENTS

JP    2017-051953        3/2017
WO   WO-2005/075048 A1   8/2005
(Continued)

OTHER PUBLICATIONS

International Journal of Textile Science 2012, 1(1): 7-14 DOI: 10.5923/j.textile.20120101.02 (Year: 2012).*
(Continued)

*Primary Examiner* — Allison G Fitzsimmons
(74) *Attorney, Agent, or Firm* — Foley & Lardner LLP

(57) ABSTRACT

A filter media comprises a first fiber layer and a second fiber layer positioned downstream of the first fiber layer. The first fiber layer has a first geometric mean fiber diameter of less than 1 μm such that the geometric standard deviation of fiber diameter is greater than 2. The second fiber layer has a second geometric mean fiber diameter of less than 1 μm such that the geometric standard deviation of fiber diameter is less than 2.

19 Claims, 11 Drawing Sheets

(51) Int. Cl.
*B01D 39/20* (2006.01)
*D04H 3/00* (2012.01)

(52) U.S. Cl.
CPC ............... *B01D 2239/0636* (2013.01); *B01D 2239/0654* (2013.01); *B01D 2239/1216* (2013.01); *B01D 2239/1225* (2013.01); *B01D 2239/1233* (2013.01); *B01D 2239/1258* (2013.01)

(58) Field of Classification Search
CPC ............... B01D 39/16; B01D 39/1607; B01D 2101/00; B01D 2101/005; B01D 2239/086; B01D 2239/02; B01D 2239/06; B01D 2239/0604; B01D 2239/0618; B01D 2239/0622; B01D 2239/0627; B01D 2239/0631; B01D 2239/0636; B01D 2239/064; B01D 2239/065; B01D 2239/0654; B01D 2239/12; B01D 2239/1233; B01D 2239/125; B01D 2275/00; B01D 2275/10; B01D 2325/022
See application file for complete search history.

(56) References Cited

U.S. PATENT DOCUMENTS

| | | | |
|---|---|---|---|
| 5,785,725 | A | 7/1998 | Cusick et al. |
| 7,008,465 | B2 | 3/2006 | Graham et al. |
| 7,296,691 | B2 | 11/2007 | Koslow |
| 7,311,752 | B2 | 12/2007 | Tepper et al. |
| 7,314,497 | B2 | 1/2008 | Kahlbaugh et al. |
| 7,579,077 | B2 | 8/2009 | Dubrow et al. |
| 8,118,901 | B2 | 2/2012 | Chung et al. |
| 8,141,716 | B2 | 3/2012 | Ferrer et al. |
| 8,172,092 | B2 | 5/2012 | Green et al. |
| 8,303,693 | B2 | 11/2012 | Leung |
| 8,361,180 | B2 | 1/2013 | Lim et al. |
| 8,383,408 | B2 | 2/2013 | Schindler et al. |
| 8,394,155 | B2 | 3/2013 | Kohli et al. |
| 8,512,435 | B2 | 8/2013 | Rogers et al. |
| 8,517,185 | B2 | 8/2013 | Wieczorek et al. |
| 8,545,607 | B2 | 10/2013 | Cambo et al. |
| 8,590,712 | B2 | 11/2013 | Wieczorek et al. |
| 8,678,202 | B2 | 3/2014 | Wieczorek et al. |
| 8,978,899 | B2 | 3/2015 | Ferrer et al. |
| 9,114,339 | B2 | 8/2015 | Israel et al. |
| 9,138,669 | B2 | 9/2015 | Leung et al. |
| 9,283,501 | B2 | 3/2016 | Wertz et al. |
| 9,662,600 | B2 | 5/2017 | Parker |
| 9,731,966 | B2 | 8/2017 | Green et al. |
| 2006/0084340 | A1 | 4/2006 | Bond et al. |
| 2006/0137318 | A1 | 6/2006 | Lim et al. |
| 2010/0089819 | A1* | 4/2010 | Hamlin ............... B01D 46/0036 210/490 |
| 2010/0215939 | A1 | 8/2010 | Westbroek et al. |
| 2010/0307119 | A1 | 12/2010 | Leung et al. |
| 2011/0259813 | A1 | 10/2011 | Wertz et al. |
| 2012/0137885 | A1 | 6/2012 | Dullaert et al. |
| 2013/0115837 | A1 | 5/2013 | Kitchen et al. |
| 2014/0110354 | A1 | 4/2014 | Haberkamp et al. |
| 2016/0038865 | A1* | 2/2016 | Jones ............... B01D 39/2024 210/489 |
| 2016/0166961 | A1* | 6/2016 | Haberkamp ........... B01D 39/18 210/504 |
| 2016/0175752 | A1 | 6/2016 | Jaganathan et al. |
| 2018/0243675 | A1 | 8/2018 | Haberkamp et al. |
| 2019/0009194 | A1 | 1/2019 | Goodby et al. |

FOREIGN PATENT DOCUMENTS

| | | |
|---|---|---|
| WO | WO-2005/075054 A1 | 8/2005 |
| WO | WO-2006/137893 A2 | 12/2006 |
| WO | WO-2007/015710 A2 | 2/2007 |
| WO | WO-2007/126539 A1 | 11/2007 |
| WO | WO-2008/057397 A1 | 5/2008 |
| WO | WO-2008/063870 A1 | 5/2008 |
| WO | WO-2009/062009 A2 | 5/2009 |
| WO | WO-2009/090308 A2 | 7/2009 |
| WO | WO-2010/009043 A2 | 1/2010 |
| WO | WO-2010/088403 A2 | 8/2010 |
| WO | WO-2012/027242 A1 | 3/2012 |
| WO | WO-2012/106659 A1 | 8/2012 |
| WO | WO-2012/129094 A1 | 9/2012 |
| WO | WO-2014/093424 A1 | 6/2014 |
| WO | WO-2015/000806 A1 | 1/2015 |
| WO | WO-2015/017795 | 2/2015 |
| WO | WO-2015/059184 A1 | 4/2015 |
| WO | WO-2016/040758 A1 | 3/2016 |
| WO | WO-2016/066825 A9 | 5/2016 |
| WO | WO-2016/138151 A1 | 9/2016 |
| WO | WO-2016/168396 A1 | 10/2016 |
| WO | WO-2016/205621 A1 | 12/2016 |
| WO | WO-2017/184615 | 10/2017 |
| WO | WO-2017/187021 A1 | 11/2017 |
| WO | WO-2017/210301 A1 | 12/2017 |
| WO | WO-2017/214419 A1 | 12/2017 |
| WO | WO-2018/011347 A1 | 1/2018 |
| WO | WO-2018/183481 A1 | 10/2018 |
| WO | WO-2018/187465 A1 | 10/2018 |

OTHER PUBLICATIONS

Wang et al., Polymer 55 (2014) 673e685 (Year: 2014).*
First Office Action issued for Chinese Patent Application No. CN 201980029556.4 issued Oct. 22, 2021, with translation 16 pages.
International Search Report and Written Opinion issued for PCT/US2019/029955, issued Sep. 13, 2019, 9 pages.
First Office Action issued for Indian Patent Application No. 202047046913, issued Dtd Apr. 20, 2021.

* cited by examiner

COMPOSITE FILTER MEDIA WITH MULTIPLE FIBER STRUCTURES INCLUDING NANOFIBERS

CROSS REFERENCE TO RELATED APPLICATIONS

The present application is a National Stage of PCT Application No. PCT/US2019/029955, filed Apr. 30, 2019, which claims priority to and benefit of U.S. Provisional Patent Application No. 62/666,315, filed May 3, 2018. The contents of these applications are herein incorporated by reference in their entirety.

TECHNICAL FIELD

The present disclosure relates generally to filters for use with internal combustion engine systems.

BACKGROUND

Internal combustion engines generally use various fluids during operation. For example, fuel (e.g., diesel, gasoline, natural gas, etc.) is used to run the engine. Air may be mixed with the fuel to produce an air-fuel mixture, which is then used by the engine to run under stoichiometric or lean conditions. Furthermore, one or more lubricants may be provided to the engine to lubricate various parts of the engine (e.g., piston cylinder, crankshaft, bearings, gears, valves, cams, etc.). These fluids may become contaminated with particulate matter (e.g., carbon, dust, metal particles, etc.) which may damage the various parts of the engine if not removed from the fluid. To remove such particulate matter, or otherwise contaminants, the fluid is generally passed through a filter element (e.g., a fuel filter, a lubricant filter, an air filter, etc.) structured to remove the particulate matter from the fluid, prior to delivering the fluid. There is an increasing demand for filters that provide high particulate removal, low restriction, and long life in the field.

SUMMARY

Embodiments described herein relate generally to filter media comprising multiple fiber structures including nanofibers. Embodiments herein relate more particularly to filter media comprising an upstream fiber layer configured to reduce concentration of small particles without becoming overloaded by larger particles, and a downstream fiber layer configured to remove the small particles while removing an increasing concentration of large particles.

In a set of embodiments, a filter media comprises a first fiber layer and a second fiber layer positioned downstream of the first fiber layer. The first fiber layer has a first geometric mean fiber diameter of less than 1 μm and have a geometric standard deviation of greater than 2. The second fiber layer has a second geometric mean fiber diameter of less than 1 μm and have a geometric standard deviation of less than or equal to 2. In some embodiments, the geometric mean fiber diameter of the first fiber layer is less than or equal to a second geometric mean fiber diameter of the second fiber layer. In some embodiments, the geometric mean fiber diameter of the second fiber layer is greater than or equal to the first geometric mean fiber diameter of the first fiber layer.

In another set of embodiments, a filter media comprises a first fiber layer, and a second fiber layer positioned downstream of the first fiber layer. A mean flow pore size (P50) for each of the first fiber layer and the second fiber layer is equal to or less than 10 μm, and a first ratio of P99 to P50 for the first fiber layer is greater than a second ratio of P99 to P50 for the second fiber layer.

In still another set of embodiments, a filter media comprises a first fiber layer, and a second fiber layer positioned downstream of the first fiber layer. The first fiber layer has a Frazier permeability of less than 20 cubic feet per minute (cfm), and the second fiber layer has a Frazier permeability greater than 5 cfm.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
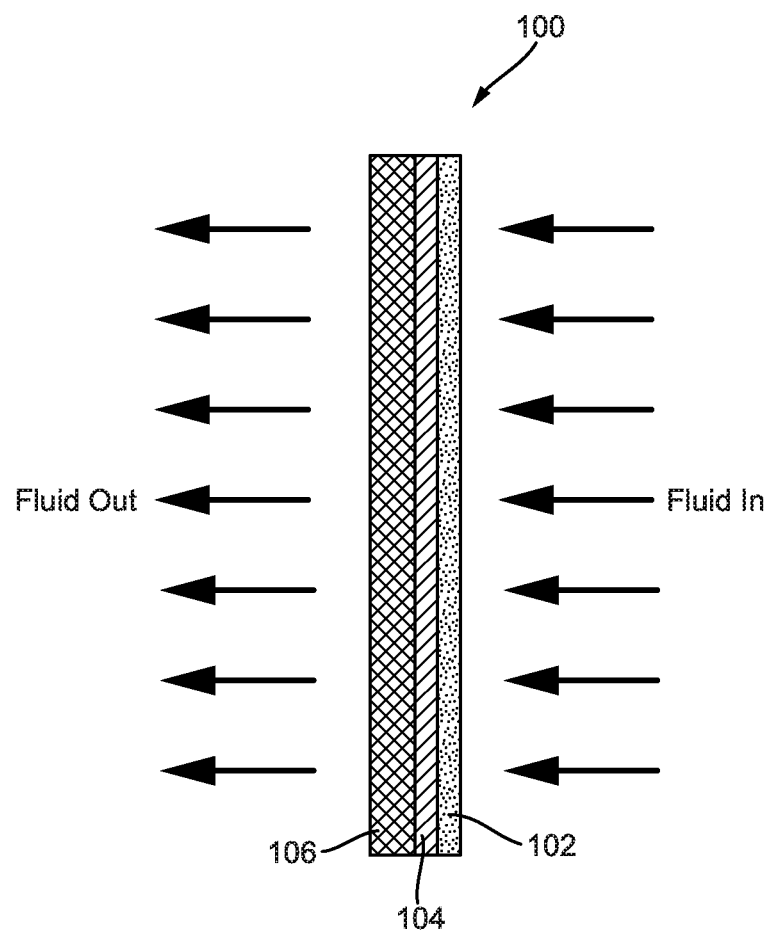
FIG. 1 is a schematic illustration of a filter media, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to filter media having multiple fiber structures including nanofibers and in particular, to filter media comprising an upstream fiber layer configured to reduce concentration of small particles without becoming overloaded by larger particles, and a downstream fiber layer configured to remove the small particles while removing an increasing concentration of large particles.

There is an increasing demand for filters that provide high particulate removal, low restriction, and long life in the field. Filter media possessing nanofibers, either in layers or mixed with other fibers, are used to meet these competing requirements. For engine, hydraulic and equipment applications, two approaches have been used. The first type uses filter media possessing at least one layer of polymeric nanofiber filter media. The nanofiber layer of this media is characterized by having a narrow fiber diameter distribution, i.e., geometric standard deviation of less than 1.8 to 2.0, and very few, if any, fibers larger than 1 μm. This media exhibits high removal efficiency, even at fine particle sizes of 4 μm(c) and below, that tends to be relatively constant or to increase over the life of the filter. Due to its high particle removal efficiency at all particle sizes, dust holding capacity and filter life may be shorter than alternative approaches under some conditions. This media uses essentially continuous polymeric fibers, hence is not subject to breakage or cracking at pleat tips that is experienced with media made from mixtures of shorter length fibers.

The second type uses filter media possessing nanofiber media, composed primarily of glass fibers with fiber lengths on the scale of mm to cm, with a broad fiber diameter distribution, i.e., geometric standard deviation greater than 1.8 to 2.0. The fibers are typically bonded together with a resin, e.g., phenolic or acrylic. This media exhibits high removal efficiency, even at fine particle sizes of 4 μm(c) and below, but lower removal efficiency compared to polymeric nanofiber at particle sizes larger than about 6 μm(c). Further, removal tends to deteriorate as the filter loads, particularly at the larger particle sizes. This media is prone to media migration and built-in contamination, i.e., the release and migration of glass particles and fiber fragments into the fluid downstream of the filter. It is also susceptible to developing "cracks" or holes at pleat tips that compromise performance. Media migration, built-in contamination, and pleat cracking are the result of the use of relatively short lengths of relatively brittle fibers to produce the media and can lead to damage of downstream components, such as fuel injector for high pressure common rail fuel systems, or servo valves for hydraulic systems. On the other hand, apparent dust holding capacity and filter life can be greater than with polymeric nanofiber media, as the media is removing less total contaminant per unit time.

There are two basic approaches to increasing filter life for the described filter applications: increasing the media surface area within the volume of the filter, and gradient filtration. Increasing media surface area is accomplished via the way the media is packaged in the filter housing. As such, thinner media allows for increased pleat density and greater surface area to be packaged in a given volume.

Gradient density filtration uses successive layers of filter media (going from upstream to downstream) such that each layer provides greater removal than its preceding layer. This may be accomplished by utilizing filter media in which each successive layer has greater density (i.e., lower porosity or greater solidity) and/or decreased fiber diameter. The increasing density and/or decreasing fiber diameter results in a reduction in Frazier permeability with each succeeding layer. There may be higher Frazier permeability layer(s) upstream, downstream or even between some of the gradient layers to improve functionality, e.g., processability or to protect filtration layers from damage, however these are not intended to be filtration layers. The intent of gradient density filtration is to distribute contaminant more evenly over the depth of the filter media with coarser particles being removed nearer to the upstream face and finer particles penetrating deeper into the filter media. Gradient density filtration however, increases the thickness of the filter media and can reduce the number of pleats within a given volume and correspondingly reduce the media surface area that can be packaged in a given volume.

Various embodiments described herein provide staged filtration using successive layers of filter media (going from upstream to downstream) such that the layers work in concert at different stages of filter loading to provide consistent and high levels of removal. Working together, an upstream first fiber layer reduces the loading of small particles to a downstream second fiber layer and delays loading of larger particles on the second fiber layer, thus extending its life. As removal by the first fiber layer deteriorates, the second fiber layer compensates by removing increasing amounts of contaminant. The second fiber layer further reduces the concentration of small particles while removing the increasing concentration of larger particles passing through the first fiber layer, as well as any glass particles, fibers, or other particles that might be released from the first fiber layer. The combination of the first and second fiber layers provides consistently high removal efficiency and increased life.

Various embodiments of the staged filter media described herein may provide benefits including, for example: (1) providing at least two nanofiber layers that work in concert to provide high filtering efficiency for removing particles having a diameter of less than 6 μm(c); (2) using an upstream nanofiber layer having a broad pore size distribution allowing the filter media to remove small particles in the range of 1-2 μm(c) without being overloaded with large particles having a diameter of greater than 2 μm(c) so as to delay loading of both small and large particles on a downstream nanofiber layer; (3) using the downstream nanofiber layer to further reduce concentration of small particles while removing any large particles passing through the upstream nanofiber layer; (4) increasing filtering efficiency as well as life of the filter media; and (5) achieving these benefits using thinner filter media than can be achieved using gradient density filtration media.

Thus, the staged filter media described herein significantly increases filter life and capacity, while at the same time maintaining or improving removal filtration efficiency using two layers of filter media with similar mean fiber diameter and pore size. While other efforts have focused on doubling the depth of a filter media (e.g., using two similar glass layers or using two similar polymeric layers), such applications are not able to accomplish the benefits of the staged filter media described according to the various embodiments herein. This is due to the two layers of the staged filter media described herein differing greatly in terms of their fiber diameter distribution, pore size distribution and/or Frazier permeability. Furthermore, the benefits of the staged filter media described herein may also be achieved in implementations in which each of the two layers included in the staged filter media include fibers having nanometer scale dimensions. For microfiber and cellulose media, the fibers and pores are too large compared to what needs to be removed for their fiber diameter distribution and pore size distribution to be of consequence.

Filtration practice uses gradient density filtration to extend filter media life, i.e., each successive layer of filter media (going from upstream to downstream) provides greater removal than its preceding layer. Gradient density filtration is also characterized by reduced permeability with succeeding layers. As discussed in U.S. Pat. No. 5,762,670, for example, this may be accomplished by using filter media in which each successive layer has greater density (i.e., lower porosity or greater solidity) and/or decreased fiber diameter. U.S. Pat. No. 5,762,670 further states that "the innermost of the two layers being compared is constructed and arranged to more effectively trap smaller particles" where the inner most layer is the downstream layer. In such arrangements, the downstream-most of the two layers being compared is constructed and arranged to more effectively trap smaller particles. In this manner, gradient density filtration distributes contaminant more evenly over the entire depth of the filter media with coarser particles being removed nearer to the upstream face and finer particles penetrating deeper into the filter media.

In contrast, embodiments described herein describe a staged filter media configured for staged filtration that includes a first fiber layer (also referred to herein as the "first media layer") with geometric mean fiber diameter less than 1 μm and broad fiber diameter distribution (geometric standard deviation greater than 1.8 or 2.0), and a second downstream fiber layer (also referred to herein as the "second media layer") with geometric mean fiber diameter less than 1 μm and narrow fiber diameter distribution (geometric standard deviation less than 2.0, 1.8 or 1.7). Correspondingly, a first ratio of P99 to P50 for the first fiber layer is greater than a second ratio of P99 to P50 for the second fiber layer, i.e., this first ratio for the first fiber layer is greater than 2 or 3, and the second ratio is less than 3 and ideally less than 2 for the second fiber layer. In some embodiments, the P50 for the first fiber layer may be approximately equal to or smaller than second fiber layer. In some embodiments, the Frazier permeability of the second fiber layer may be greater than the first fiber layer in order to maintain the benefits of the embodiments described herein, while reducing the thickness of the resultant media permitting increased media surface area to be packaged in a given volume. In some embodiments, the first fiber layer may have a similar or higher removal of fine particles, smaller than about 6 μm(c), than the second fiber layer. This is contrary to the goal of gradient filtration for the downstream layer to "more effectively trap smaller particles." Instead, embodiments described herein improve life by regulating the removal of larger particles by the upstream first fiber layer over the life of the filter media, while at the same time controlling the concentration of finer particles reaching the downstream second fiber layer. The downstream second fiber layer, on the other hand, causes larger particles not captured or shedding from the first fiber layer to be captured and retained, thus protecting downstream components.

PCT Publication No. WO2015017795 (corresponding to U.S. Pat. No. 9,987,578) demonstrates the use of gradient density filters with narrow fiber diameter distribution and conventional gradient filtration with broad fiber diameter distribution to increase nanofiber filter media life. Increases in dust holding apparent capacity of 24 to 70% have been observed using PTI 0-5 μm dust, which is significantly smaller than the apparent capacity increase of 214% observed using staged filter media according to the embodiments described herein. According to PCT Publication No. WO2015017795, the apparent capacity for polymeric filter media arranged with the smallest mean nanofiber diameter upstream of the largest mean nanofiber diameter exhibited a reduction in apparent capacity of 37%, as expected based on conventional filtration theory and practice. Similarly, increasing filter media thickness without changing fiber diameter or porosity also decreases apparent capacity. In placing a nanofiber layer with broad fiber diameter distribution upstream of a nanofiber layer with narrow fiber diameter distribution according to the embodiments described herein increases apparent capacity, even when the upstream nanofiber layer has about the same or finer fiber diameter than the downstream nanofiber layer.

The advantages of the filter media described herein rest in large part to the realization that a broad pore size distribution may be used to extend the life of narrow pore size distribution media while increasing contaminant removal. A significant innovation with this invention comes from the realization that filter life (capacity) for very high removal efficiency filter media, as is used in high pressure common rail filtration, is less affected by the presence of large particles, than by the concentration of fine particles, organic contaminants, and semisolid contaminant. As such, gradient density filtration, which seeks to remove successively finer particles as fluid passes through a filter, is less effective. Embodiments described herein include a broad fiber diameter distribution (and resultant broad pore size distribution) of first fiber layer which reduces the loading of problematic fine particles, organic contaminants, and semisolids during earlier stages of filter life and extends the life of second fiber layer. The key is the difference in the fiber diameter distributions of the two layers, as reflected by their geometric mean and standard deviations and, to a lesser extent, relative proportion of microfibers to nanofibers, of the two layers. This difference allows the media to take advantage of the changing upstream pore size distribution to improve utilization of the filter media surface over time, while gradient density filtration removes particles as a function of size within the depth of the filter media.

The combination of broad and narrow fiber diameter distribution filter media layers to increase filter life, capacity and removal is a new concept. Nonwoven fibrous filter media with geometric mean fiber diameter greater than 1 μm has been the staple for the filtration industry for decades. Such filter media, whether made using cellulose, polymeric or glass fibers, have an inherently broad fiber diameter and pore size distribution. This only changed relatively recently with the introduction of high pressure common rail fuel systems for diesel engines and the corresponding demand for both high removal efficiency at both very small particle sizes and larger particle sizes without loss of filter life. This led to the introduction of polymeric nanofiber filter media with its corresponding narrow pore size distribution for these applications and demand for increased filter life. As previously noted in the '795 publication, the use of broad fiber diameter distribution media using fibers with geometric mean diameter greater than 1 μm is incapable of meeting this demand without the use of multiple fiber layers and increased thickness of the composite media. In contrast, the combination of two nanofiber layers with the indicated differences in fiber diameter distribution of the filter media according to the embodiments described herein provides the required high removal at all particle sizes, long life, increased capacity, and potentially thinner combined filter media not attainable by gradient density filtration approaches.

It should be appreciated that the filter media described herein use the fiber diameter (or pore size) distribution of the various layers included therein to increase life, as opposed to the relative mean fiber diameters or porosity of the layers. More specifically, a broad pore size distribution media is used to extend the life of narrow pore size distribution media. A significant benefit of the filter media described herein emerges from the realization that filter life (capacity) for very high removal efficiency filter media, as is used in high pressure common rail filtration, is less affected by the presence of large particles, than by the concentration of fine particles, organic contaminants, and semi-solid contaminants. As such, gradient density filtration, which seeks to remove successively fine particles as fluid passes through a filter, is less effective. Embodiments of the filter media described herein include a broad fiber diameter distribution (and corresponding broad pore size distribution) of an upstream nanofiber layer which reduces the loading of problematic fine particles, organic contaminants and semi-solids during earlier stages of filter life and extends the life of a downstream nanofiber layer. The key is the difference in the fiber diameter distributions of the two layers, as reflected by their geometric standard deviations and relative proportion of microfibers to nanofibers, of the two layers, as described herein. This difference allows the filter media described herein to take advantage of the changing upstream pore size distribution to improve utilization of the filter media surface over time, while in contrast gradient density filtration focuses on removal of particles as a function of size within the depth of the media, and does not consider of how this changes over time or loading.

FIG. 1 is a schematic illustration of a filter media 100, according to an embodiment. The filter media 100 may be used to filter any fluid, for example, air or air-fuel mixture, lubricants, fuels, and in some embodiments, may also be used to separate water or oil from an air-oil mixture (e.g., used as crankcase ventilation coalescer filter media). The filter media 100 may be used in filters to protect equipment, e.g., diesel engines, hydraulic systems, HVAC and cleanrooms, spark-ignited engines, etc.

The filter media 100 comprises a first fiber layer 102 and a second fiber layer 104 positioned downstream of the first fiber layer 102. In some embodiments, the filter media 100 may also include a substrate 106. The second fiber layer 104 may be interposed between the first fiber layer 102 and the substrate 106 as shown in FIG. 1, or positioned downstream of the substrate 106. Furthermore, any number of additional fiber layers may be provided upstream of the first fiber layer 102, between the first fiber layer 102 and the second fiber layer 104, between the second fiber layer 104 and the substrate 106 upstream of the substrate 106, downstream of the substrate 106, between the substrate 106 and the second fiber layer 104 downstream of the substrate 106, or any other suitable combination.

For example, in various embodiments, a filter media may include a melt blown layer (M), an upstream glass nanofiber layer or a polymeric nanofiber layer (G), a downstream polymeric nanofiber layer (N), a spun-bound layer (S), and/or a cellulose layer (F), where G corresponds to the first fiber layer 102 and N corresponds to the second fiber layer 104 previously described. These layers may be arranged in any suitable configuration, for example, MGNS, MGNNS, MGGNNS, MMGNNS, MMGNS, MMGGNNS, MGNF, MGNNF, MGGNNF, MMGNF, MMGGNNF, GNF, GNNF, GGNNF, GNS, GNNS, GGNNS, SGNS, SGNNS, SGGNNS, SGNF, SGNNF, SGGNNF, MGMNS, MGSN, FGNS where the left most layer is the first upstream layer and the right most layer is the last downstream layer. While each of the layers M, G, N, S, and F are described as being formed from a particular material, it should be appreciated that these are just examples, and each of the layers M, G, N, S, and F can be formed from any suitable material, for example, a refractory material, a polymeric material, carbon, ceramics, etc.

In some embodiments, the first fiber layer 102 and the second fiber layer 104 include nanofiber layers. As described herein, a nanofiber layer comprises a layer of media in which more than 80% of the fibers by number are smaller than 1 μm in diameter. In some embodiments, preferably the first fiber layer 102 and the second nanofiber layer 104 are positioned adjacent to one another (e.g., the second fiber layer 104 positioned downstream of the first fiber layer 102); however, there may be one or more others layers of filter media between them, in some embodiments. The first fiber layer 102 may include fibers having a broad fiber diameter distribution exhibiting a first geometric mean fiber diameter of less than 1 μm and a geometric standard deviation greater than 1.8 or 2. In some embodiments, between 2 and 20% of the fibers by number are greater than 1 μm.

The second fiber layer 104 may include fibers having a second geometric mean fiber diameter less than 1 μm and a geometric standard deviation less than or equal to 1.8 or 2. In some embodiments, less than 15% of fibers of the second fiber layer 104 by number are larger than 1 μm. In some embodiments, the first geometric mean fiber diameter of the first fiber layer 102 is less than or equal to the geometric mean fiber diameter of the second nanofiber layer 104. This relative difference in geometric mean fiber diameter may enable utilization of all three methods to increase filter life, i.e., gradient density filtration, increased media surface area, and breadth of the fiber diameter distribution, as having a smaller fiber diameter for the first fiber layer 102 compared to the second fiber layer 104 enables thinner media to be used to attain the same or greater removal and filter life. Furthermore, the second geometric mean fiber diameter of the second fiber layer 104 may be greater than or equal to the first geometric mean fiber diameter of the first fiber layer 102 in order to reduce the thickness of the media while retaining the benefits previously described. In other embodiments, the first geometric mean fiber diameter may be equal to or larger than the second geometric mean fiber diameter. In some embodiments, the first fiber layer 102 may comprise a refractory material such as glass (e.g., produced using a combination of heating, extruding, wet laying or any other suitable process). Furthermore, the second fiber layer 104 may include a polymeric material such as a polymeric nanofiber layer e.g., polyamide, polyester, fluorocarbon, rayon, Kevlar or any other suitable polymer.

In some embodiments, the filter media 100 may also include the substrate 106. The substrate 106 may be composed of coarser fiber than the first fiber layer 102 and the second fiber layer 104, for example having a geometric mean fiber diameter larger than 1 μm. In some embodiments, the substrate 106 may include fibers comprising cellulose, polymeric, synthetic, or a blend of fibers of different types. Substrate 106 fibers may be bonded together using phenolic, acrylic or other resin systems, or the fibers may be thermally bonded together. In other embodiments, the substrate 106 fibers may be bonded together using chemical means. The substrate 106 may support the first fiber layer 102 and the second fiber layer 104, and may allow the filter media 100 to be formed and retain the desired shape during production, transport and use.

Additional layers of filter media may be present, such as a layer of coarse, low restriction filter media on the upstream face (e.g., upstream of the first fiber layer 102) to protect the first fiber layer 102 and/or second fiber layer 104 from damage during processing, handling and use. In some embodiments, a microfiber media layer, e.g., melt blown or melt spun media layer may be positioned upstream of the first fiber layer 102 and/or second fiber layer 104 to further increase life. While various embodiments describe the upstream first fiber layer 102 being adjacent to the downstream second fiber layer 104, other layers of filter media may be located between these two layers, provided that the additional layers possess a greater geometric mean fiber diameter, greater P50, and/or greater Frazier permeability than either the first fiber layer 102 or second fiber layer 104.

The first fiber layer 102, the second fiber layer 104 and/or any other layers included in the filter media 100 may be bonded to one another by thermal, sonic, chemical (e.g., resins or adhesives), or mechanical bonding (e.g., co-pleating). The first fiber layer 102 and the second fiber layer 104 may be used in combination, such that first fiber layer 102 is located upstream of the second fiber layer 104. In some embodiments, a first ratio of the P99 to mean flow pore size (P50) for the first fiber layer 102 is greater than 2 or 3, and a second ratio of the P99 to mean flow pore size (P50) for the second fiber layer 102 is less than 3 and preferably less than 2. In some embodiments, each of the first and second fiber layers 102 and 104 may have a mean flow pore size (P50) of less than 10 or 5 μm (e.g., less than 4, 3, 2, or 1 μm). "P50" and "P99" refer to the media pore size such that the indicated percentage of the total flow, 50% or 99%, respectively, passes through pores equal to or smaller than the indicated size as determined using a Porous Materials Inc. Porometer and Porewick® or other suitable fluid. For example, a P50 of 5 μm indicates that 50% of the flow through the media indicated layer is passing through pores having an effective diameter of ≤5 μm.

In some embodiments, a ratio the mean fiber diameter of the first fiber layer 102 to the mean fiber diameter of the second fiber layer 104 may be less than or equal to 1, and the Frazier permeability of the first and second fiber layers 102 and 104 may be less than 10 cfm (e.g., less than 9, 8, 7, 6, or 5 cfm). In some embodiments, the Frazier permeability of the first fiber layer 102 may be less than the Frazier permeability of the second fiber layer 104 in order to reduce the thickness of the combined filter media without loss of performance. Frazier or air permeability may be measured by ASTM D737 at a pressure drop of 125 kPa, and thickness may be measured by ASTM D5729. In some embodiments, a ratio of a Frazier permeability of the first fiber layer 102 to the second fiber layer 104 may be in a range of 0.3-2.0, 0.4-1.8, or 0.5-1.1.

In some embodiments, the first fiber layer 102 may be composed primarily of glass nanofibers, with a substantial number of coarser glass fibers incorporated therein. In various embodiments, the first fiber layer 102 may be formed by a wet-laid process and mixing glass fibers of different diameters and/or lengths. The fibers of the first fiber layer 102 may be predominantly inorganic, preferably glass or other refractory material that is not burned off at 500° C. These glass fibers tend to be millimeter to centimeter long. For example, in particular embodiments, glass nanofiber with a mean diameter of 0.3 μm with a lesser amount of glass microfiber with a mean diameter of approximately 1 to 4 μm is bonded together with 10% (by mass) phenolic resin so as to form the first fiber layer 102. The nanofibers in such embodiments may have a length between 1 and 30 mm. The nanofibers may be bonded together using a resin or adhesive, such as phenolic or acrylic.

In other embodiments, the nanofibers of the first fiber layer 102 may be held together by thermal or mechanical processes, or by incorporation of lower melting point polymeric fibers or particles into the matrix and thermally bonding the fibers together. Greater than 50% of the mass of the first fiber layer 102 may comprise glass, ceramic, metal, metal oxide, or other refractory material. In particular embodiments, greater than 75% of the mass of the first fiber layer 102 is glass or other refractory material. Other polymeric fibers may be incorporated into the first fiber layer 102 in some embodiments to improve certain functional aspects, such as pleatability.

Figure 2:
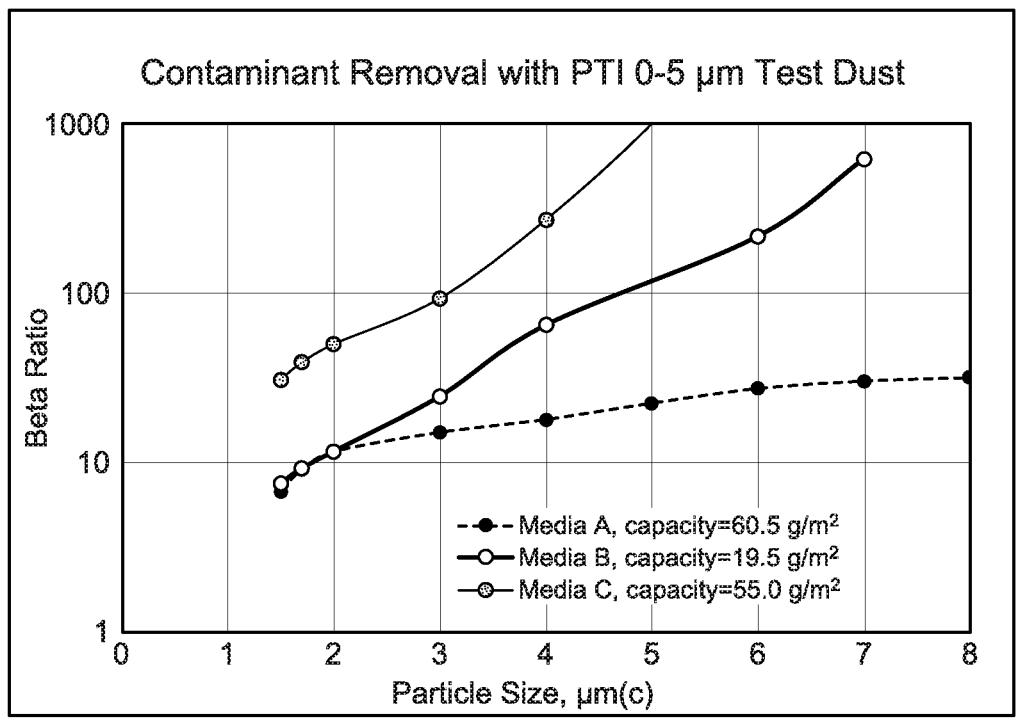
FIG. 2 are plots of contaminant removal expressed as beta ratios of a glass nanofiber filter media (Media A), a polymeric nanofiber media (Media B) and Media C, which includes the polymeric nanofiber media positioned downstream of the glass filter media, in response to a dust including particles in a range of 0-5 μm flowing through the Medias A, B and C.

During operation, it is generally fine particles having a diameter smaller than about 6 μm(c) that cause plugging of filter media including polymeric nanofiber layers in certain demanding applications, while glass nanofiber media alone does not adequately protect downstream components from larger sized particles. Polymeric nanofiber media has a sharper size cut-off with respect to removal, i.e., a steeper removal versus particle size behavior (as illustrated in FIG. 2), which provides improved capture of these highly damaging particles, some of which may pass through layer 102. In comparison, the first fiber layer 102 of the filter media 100 is intended to reduce the concentration of fine particles, i.e., smaller than about 6 μm(c), without becoming overloaded by larger particles. Further, the first fiber layer 102 delays the time it takes for significant quantities of these larger contaminants to reach the second fiber layer 104. The first fiber layer 102 includes a broad pore size distribution but small mean flow pore size. In some embodiments, the first fiber layer 102 may include glass media, as previously described, with a mean flow pore size (P50) of less than 10, or 5 or 3 μm and a P99 to P50 ratio of greater than 2 or 3 so as to provide a desired balance between high fine particle removal and reduced large particle removal. At P50 larger than 3 μm, removal of fine particles is insufficient to protect the second fiber layer 104 from plugging in some applications. On the other hand, P99 to P50 ratio of less than 2 may lead to excessively high removal of larger particles and premature plugging of the first fiber layer 102.

To prevent the above, in some embodiments, the first fiber layer 102 may have the following properties: (a) geometric mean fiber diameter of less than 1 μm; (b) geometric standard deviation of greater than 1.8, and preferably greater than or equal to 2.0; and (c) between 2 and 20% of the fibers by number, such as determined by SEM, are greater than 1 μm; preferably between 2 and 10%; and more preferably between 3 and 7%. These properties yield a first fiber layer 102 that may have the following characteristics: (a) P50 is 10 or 5 μm or less; (b) the ratio of P99 to P50 for the first fiber layer is greater than 2 or 3; and (c) Frazier permeability of less than 20 or 15 cfm, preferably less than 10 cfm, and more preferably less than 5 cfm feet per minute. In some embodiments, the geometric mean fiber diameter of the first fiber layer 102 is less than or equal to the geometric mean fiber diameter of the second fiber layer 104 in order to reduce the thickness of the combined filter media while maintaining the desired filter life, capacity and removal characteristics. In particular embodiments, the first fiber layer 102 contains greater than 50% refractory material (e.g., greater than 55%, 60%, 65%, 70% or 75% inclusive of all ranges and values therebetween). In some embodiments, the first fiber layer 102 may have a thickness between 50 and 2,000 μm. In various embodiments, the first fiber layer 102 may be formed by a wet-laid process, by mixing glass fibers of at least two different diameters, e.g., a nanofiber and a microfiber, by incorporation of lower melting point polymeric fibers or particles or fibers with a lower melting point sheath into a matrix of glass nanofibers and thermally bonding the fibers together.

The second fiber layer 104 is located downstream of the first fiber layer 102, and in some embodiments, may be formed from polymeric nanofiber. The second fiber layer 104 may include a de minimis or insignificant amount of coarse fibers (by number) with diameter greater than 1 μm. In various embodiments, the second fiber layer 104 may be characterized by having: (a) a geometric mean fiber diameter of less than 1 μm; (b) geometric standard deviation of less than or equal to 2.0 or 1.8, and preferably less than or equal to 1.7; and (c) less than 15, 10, 5, and 2% of the fibers by number are larger than 1 μm.

These properties may cause the second fiber layer 104 to have the following characteristics: (a) P50 is 10 μm or less; (b) a second ratio of P99 to P50 is less than 3 and ideally less than 2 for the second fiber layer 104; and (c) Frazier permeability of greater than 5 cfm. In some embodiments, the second geometric mean fiber diameter of the second fiber layer 104 may be greater than or equal to the first geometric mean fiber diameter of the first fiber layer 102 in order to reduce the thickness of the combined filter media while maintaining the desired filter life, capacity and removal characteristics. In some embodiments, the second fiber layer 104 may have a Frazier permeability greater than or equal to the first fiber layer 102.

In some embodiments, the second fiber layer 104 is includes polymeric material. In other embodiments, the second fiber layer 104 includes refractory material. In still other embodiments, the second fiber layer 104 includes a combination of polymeric and refractory material. In particular embodiments, the second fiber layer 104 may contain less than 5% refractory material, and preferably less than 2%. In other embodiments, the second fiber layer 104 is formed from continuous polymeric fiber, e.g., polyamide, polyester, fluorocarbon, with fibers thermally bonded together (e.g., by incorporation of lower melting point polymeric fibers or particles or fibers with a lower melting point sheath into the matrix and thermally bonding the fibers together) to form the second fiber layer 104 or held together by mechanical, or chemical means, e.g., use of a resin or adhesive. In particular embodiments, the second fiber layer 104 comprises nylon. In such embodiments, the nylon may be dissolved in formic acid to form a solution. The solution may be deposited on a substrate to produce a nylon fiber layer. The formic acid is then evaporated to leave nylon fibers bonded together in the nylon fiber layer.

It should be appreciated that the second fiber layer 104 is not a membrane, and may be formed by melt-blowing, solution spinning, electrospinning, electroblowing, melt-spinning, or other means known in the art. Examples of means for producing such a layer are described in US20130115837A1, US20130206683A1, US20150298070A1, US20150360157A1, US20160166961A1, US20160256806A1, US20170304755A1, U.S. Pat. No. 6,743,273B2, U.S. Pat. No. 6,872,311B2, U.S. Pat. No. 7,070,640B2, U.S. Pat. No. 7,105,124B2, U.S. Pat. No. 7,316,723B2, U.S. Pat. No. 7,318,852B2, U.S. Pat. No. 7,959,848B2, U.S. Pat. No. 8,029,588B2, U.S. Pat. No. 8,172,092B2, U.S. Pat. No. 8,361,180B2, U.S. Pat. No. 8,590,712B2, U.S. Pat. No. 8,679,218B2, and U.S. Pat. No. 8,689,985B2, incorporated by reference herein in their entirety.

In some embodiments, the second fiber layer 104 has a thickness between 50 and 2,000 μm and preferably between 100 and 500 μm. In some embodiments, the first fiber layer 102 and the second nanofiber layer 104 are positioned adjacent to one another (e.g., the second fiber layer 104 positioned downstream of the first fiber layer 102); however, there may be one or more others layers of filter media between them, in some embodiments. The first fiber layer 102 may include fibers having a broad fiber diameter distribution exhibiting (a) a geometric standard deviation greater than 1.8 or 2.0, (b) a geometric mean fiber diameter of less than 1 (c) a geometric mean fiber diameter is less than or equal to the geometric mean fiber diameter of the second nanofiber layer 104, and (d) between 2 and 20% of the fibers by number are greater than 1 μm.

The second fiber layer 104 may include fibers having a narrow fiber diameter distribution exhibiting (a) geometric standard deviation less than or equal to 1.8 or 2.0, (b) geometric mean fiber diameter less than 1 μm, (c) geometric mean fiber diameter greater than or equal to the geometric mean fiber diameter of the first fiber layer 102, and (d) less than 15% of fibers of the second fiber layer 104 by number are larger than 1 μm. In some embodiments, the first fiber layer 102 may comprise glass (e.g., spin coated, woven or melt blown glass).

Furthermore, the second fiber layer 104 may include polymeric nanofiber layer e.g., polyamide, polyester, fluorocarbon rayon, Kevlar or any other suitable polymer. These characteristics may yield a first fiber layer 102 with the following properties: (a) P50 is 10 µm or less; (b) ratio of P99 to P50 is greater than 2 or 3; (c) contains greater than 50% refractory material, and preferably greater than 75%; and (d) Frazier permeability of less than 20 feet per minute, preferably less than 10 feet per minute, and more preferably less than 5 cfm. Furthermore, these characteristics may yield a second fiber layer 104 with the following properties: (a) P50 is 10 µm or less; (b) ratio of P99 to P50 is less than 3 and ideally less than 2; (c) contains less than 5% refractory material, and preferably less than 2%; (d) Frazier permeability of greater than 5 cfm; (e) Frazier permeability greater than or equal to the first fiber layer 102. In some embodiments, the thickness of each layers 102, 104 may be between 50 and 2,000 µm and preferably between 100 and 500 µm. Optionally, the filter media 100 may comprise additional media layer(s) upstream, downstream or in between the first and second fiber layers 102 and 104 to provide support and protection of the first and second fiber layers 102 and 104, facilitate processing of the filter media 100, improve adhesion between layers, or otherwise improve functionality.

In some embodiments, the geometric mean fiber diameter of each of the first fiber layer 102 and the second fiber layer 104 is less than or equal to 1 µm. Furthermore, the geometric standard deviation of fiber diameter for the first fiber layer 102 may be greater than 2, and for the second fiber layer 104 may be less than 2. In particular embodiments, a ratio of the geometric mean fiber diameter of the first fiber layer 102 to geometric mean fiber diameter of second fiber layer 104 is between 0.4 and 2.2, and preferably, less than 1. In particular embodiments, the ratio of the geometric mean fiber diameter of the first fiber layer 102 to the geometric mean fiber diameter of second fiber layer 104 may be in range of 0.4 to 2.0, 0.4 to 1.6, or 0.6 to 1.0.

In some embodiments, the mean flow pore size (P50) for each of the first fiber layer 102 and the second fiber layer 104 is less than or equal to 10 µm. In some embodiments, the first ratio of P99 to P50 ratio for the first fiber layer 102 is greater than 2 and the second ratio of P99 to P50 for the second fiber layer is less than 2. In particular embodiments, the ratio of the P50 of the first fiber layer to the P50 of the downstream second fiber layer 104 is between 0.4 and 2.5, and preferably less or equal to than 1. In some embodiments, the ratio of the P50 of the first fiber layer to the P50 of the downstream second fiber layer 104 is in a range of 0.4 to 2.5, 0.5 to 1.9, or 0.7 to 1.3.

In some embodiments, a first Frazier permeability of the first fiber layer 102 is less than 20 cfm and a second Frazier permeability of the second fiber layer 104 is greater than 5 cfm. In some embodiments, a ratio of the first Frazier permeability to the second Frazier permeability is between 0.3 and 2.5, and preferably, less than 1. In some embodiments, the ratio of the first Frazier permeability to the second Frazier permeability is in a range of 0.3 to 2.0, 0.4 to 1.8, or 0.5 to 1.1.

In some embodiments, each of the first fiber layer 102 and the second fiber layer 104 exhibit a monomodal pore size distribution. For example, the first fiber layer 102 may include greater than 70% refractory material, such as glass fibers. Furthermore, the second fiber layer 104 may be composed of polymeric fibers with less than 5% refractory material. In particular embodiments, the first fiber layer 102 and the second fiber layer 104 are disposed adjacent to one another. In other embodiments, intervening media layers may be disposed between the first fiber layer 102 and the second fiber layer 104. In such embodiments, the intervening layer or layers may have a geometrical fiber diameter, P50, and/or Frazier permeability greater than either the first fiber layer 102 or the second fiber layer 104. In some embodiments, the first fiber layer 102 and the second fiber layer 104 may be used in conjunction with a supporting layer (e.g., a scrim layer) to provide structural integrity and facilitate pleating, folding, other production steps, handling and usage.

The first and second fiber layers 102 and 104 work in concert to provide high removal efficiency and long filter media 100 life in the following manner. The upstream first fiber layer 102 exhibits a broad pore size distribution. The broad pore size distribution is the result of the broad fiber diameter distribution and presence of significant quantities of coarse, greater than 1 µm, fibers mixed in with the dominant nanofibers. Initially, the first fiber layer 102 provides relatively high removal efficiency at all particle sizes, but as it loads, the finer pores fill and become blocked. An increasing portion of the total flow is thus diverted to larger pores with lower removal efficiency. This is most evident for larger particle sizes. On the other hand, the downstream second fiber layer 104 with a narrower pore size distribution exhibits essentially constant or increasing contaminant removal with increased loading across the contaminant size range. The second fiber layer 104's narrow pore size distribution may be the result of the narrow fiber diameter distribution and near absence of coarser fibers. Such a layer provides constant or increasing removal as a function of contaminant loading. Working together, the first fiber layer 102 reduces the loading of small particles to the second fiber layer 104 and delays loading of larger particles on the second fiber layer, thus extending its life. The second fiber layer 104 further reduces the concentration of small particles while removing the increasing concentration of larger particles passing through the first fiber layer 102, as well as any glass particles or fibers that might be released from the first fiber layer 102. In contrast to gradient filtration, the geometric mean fiber diameter and permeability of the first fiber layer 102 may be less than that of the second fiber layer 104 and still achieve the benefit but using a thinner combined filter media sheet.

FIG. 2 shows plots of contaminant removal expressed as beta ratios of a glass nanofiber filter media (Media A), a polymeric nanofiber media (Media B) and Media C, which includes the polymeric nanofiber media positioned downstream of the glass filter media, in response to a test dust including particles in a range of 0-5 µm flowing through the Medias A, B, C. The data shown in FIGS. 2-7 were obtained by testing the three filter media using the ISO 4548-12 multipass filter test modified to use PTI 0-5 µm dust, instead of ISO Medium Test Dust. While filter performance is, in part, influenced by the challenge contaminant, PTI 0-5 µm dust is used for illustrative purposes since, in actual application, these filters are intended to provide protection from fine particles. Beta ratio is defined as the ratio of the number concentration of particles larger than the indicated size upstream of a filter to the downstream number concentration larger than the same size. Apparent capacity is defined as the total mass of the test dust that the filter was exposed to in order to achieve a pressure drop of 210 kPa.

For each of the three media, a high permeability spun bond nylon 6,6 scrim layer with basis weight of 17 g per square meter was placed upstream and downstream of each of the test media to provide support. The scrim layer does not significantly affect removal or filter life. The characteristics of the Medias A, B and C, are shown in Table 1.

TABLE 1

Media Properties

| | Pore Size, μm | | Frazier Permeability | Thickness | Basis Weight | | Fiber Diameter (Layer A + Layer B) | | |
|---|---|---|---|---|---|---|---|---|---|
| | | | | | | | Geometric Mean | Geometric Standard | Number Percent > 1 |
| Media | P50 | P99 | cfm | mm | Total g/m² | Refractory g/m² | μm | Dev. | μm % |
| Media A | 2.69 | 7.00 | 6.60 | 0.73 | 124 | 82.8 | 0.25 | 2.34 | 6.5 |
| Media B | 2.27 | 3.70 | 5.80 | 0.50 | 55 | 0.30 | 0.27 | 1.61 | 1.5 |
| Media C | 1.79 | 3.44 | 3.10 | 1.04 | 144 | 83 | 0.25 + 0.27 | 2.34 + 1.61 | 6.5 + 1.5 |

Media A, Hollingsworth & Vose DC4271, is a commercially available glass nanofiber media. Media B, Cummins Filtration 2 μm NanoNet®, is a commercially available polymeric nanofiber media. For purposes of illustration, Media C including an exemplary implementation of the filter media described herein, comprises an upstream layer of Media A with a downstream layer of Media B. It is noteworthy that the fiber diameter of the first fiber layer 102 of Media C is slightly smaller than the second fiber layer 104. As shown in the legend of FIG. 1, Media A has nearly 3 times the apparent dust holding capacity and Media C has about 2.8 times the apparent capacity of Media B. Media A and B exhibit similar removal for particle sizes smaller than about 3 μm(c), but for larger sizes Media B exhibits significantly greater removal. Removal with Media A starts to plateau out at sizes greater than 6 μm(c), i.e., larger particles are being captured less efficiently. The behavior of Media A is representative of broad nanofiber diameter distribution media. The behavior of Media B is representative of narrow nanofiber diameter distribution media. In comparison, Media C exhibits nearly the same apparent capacity as Media A while providing higher removal at all particle sizes, including large particles, than either Media A or B.

Figure 3:
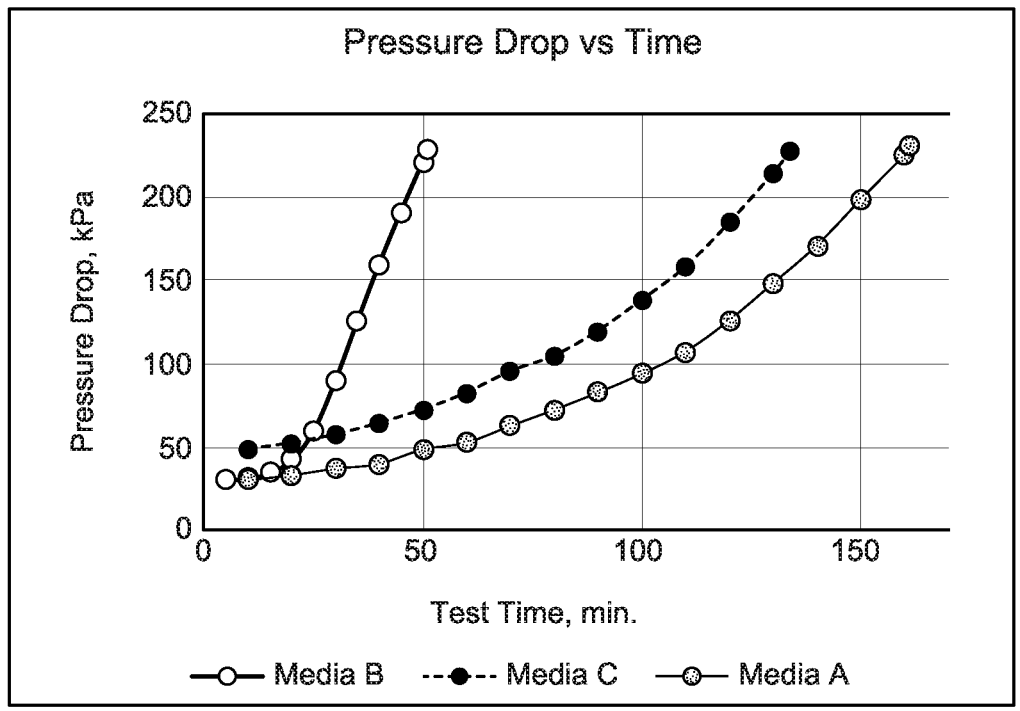
FIG. 3 are plots of pressure drop vs time of Medias A, B and C.

FIGS. 3-7 illustrate the differences between the Medias A, B and C and benefits of Media C by plotting performance as a function of test time (corresponding to contaminant loading). FIG. 3 shows pressure drop as a function of time. Narrow fiber diameter distribution Media B exhibits a quicker rise in pressure drop and lower apparent dust holding capacity under the test conditions than either of the other two media. Broad fiber diameter distribution Media A exhibits the slowest rate of pressure drop increase and the greatest apparent dust capacity. Media C, exhibits a similar slow rate of pressure drop increase and nearly the apparent capacity of Media A. This is unexpected, as Media C exhibits both a greater initial pressure drop than Media A and greater contaminant removal at all particle sizes. Considered together, one would have anticipated Media C to have a lower apparent capacity than either Media A or Media B. The improvement in apparent capacity relative to Media B is obtained through a combination of two highly efficient media layers with differing fiber diameter distribution characteristics.

Figure 4:
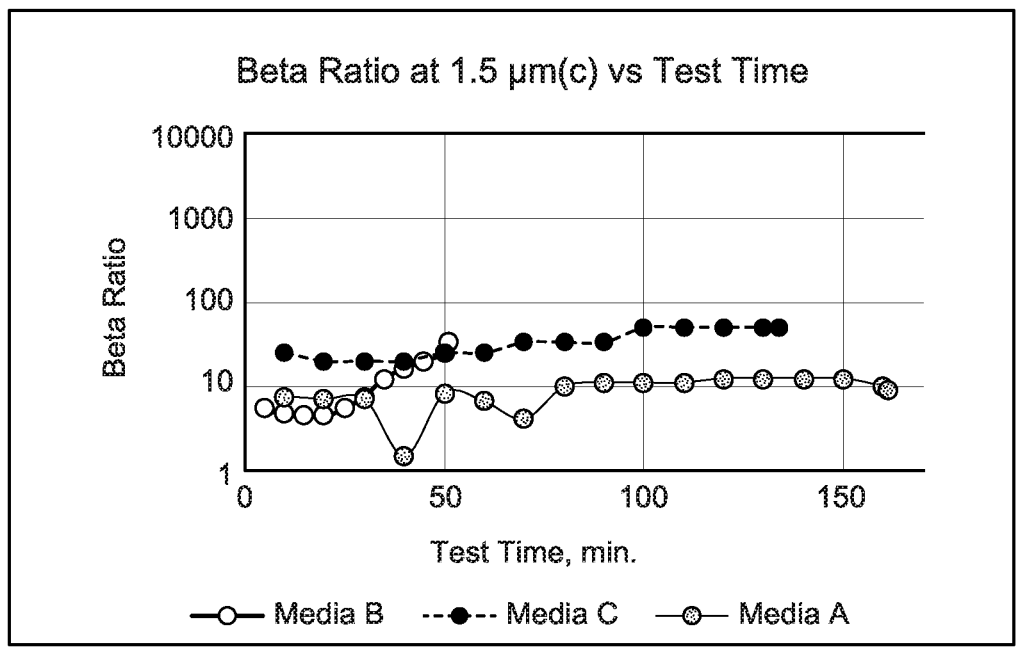
FIG. 4 are plots of beta ratio vs time for Medias A, B and C with dust including 1.5 μm(c) particles flowing therethrough.
Figure 5:
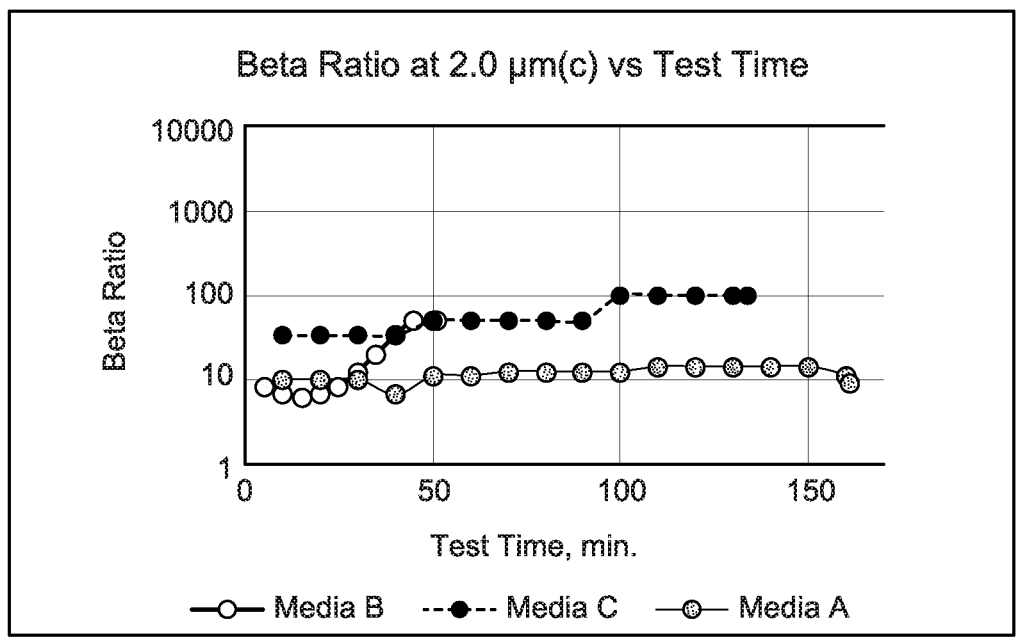
FIG. 5 are plots of beta ratio vs time for Medias A, B and C with dust including 2.0 μm(c) particles flowing therethrough.
Figure 6:
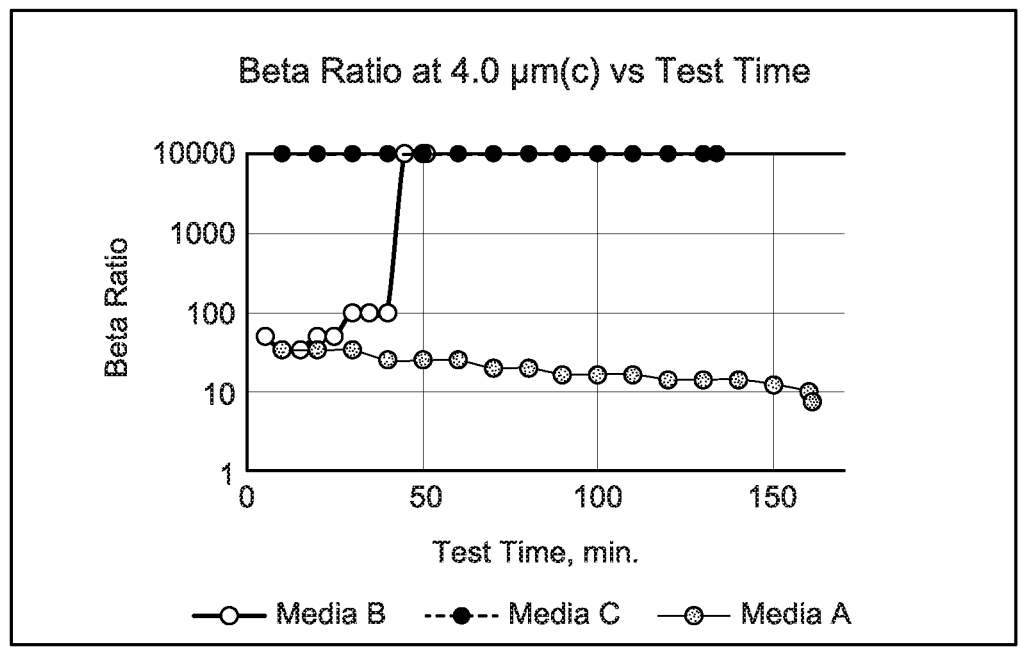
FIG. 6 are plots of beta ratio vs time for Medias A, B and C with dust including 4.0 μm(c) particles flowing therethrough.
Figure 7:
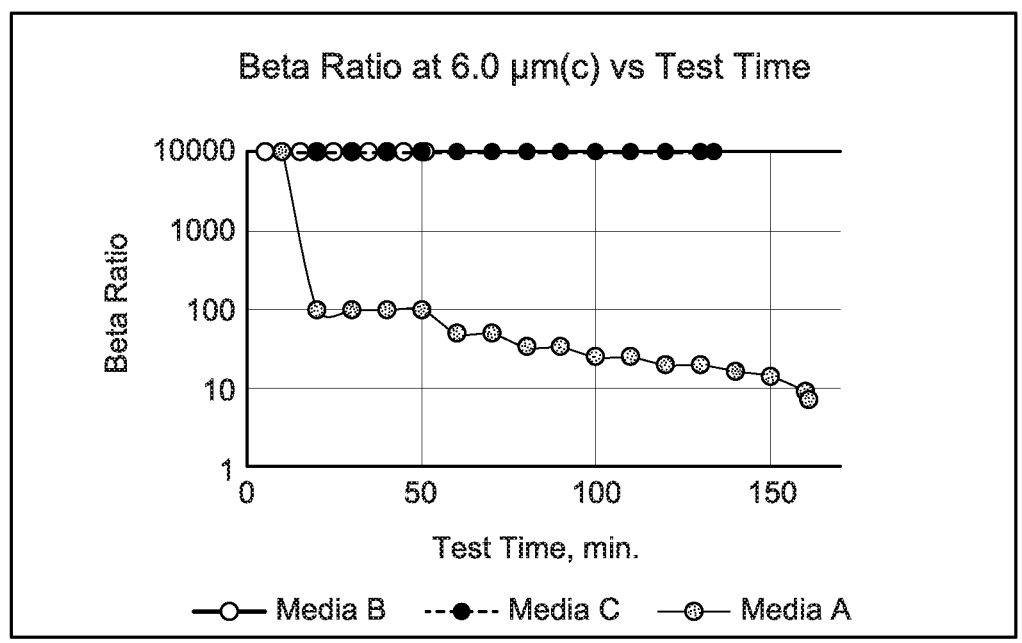
FIG. 7 are plots of beta ratio vs time for Medias A, B and C with dust including 6.0 μm(c) particles flowing therethrough.

FIGS. 4-6 illustrate the impact on contaminant removal by plotting beta ratio versus test time at various particle sizes. Media A exhibits decreasing beta ratio (i.e., decreasing removal) as a function of time for particles sizes 4 μm(c) and larger. This is characteristic of broad fiber diameter distribution media. As smaller pores in the media fill, flow is diverted to larger pores where removal is lower. In FIGS. 4 and 5, at test times of 40 and 70 minutes, Media A appears to exhibit minima. These are artifacts of this specific test, and were not observed in other tests. Media B, on the other hand, exhibits increasing beta ratio with time over the size range 1.5 μm(c) and greater. This is characteristic of narrow fiber diameter distribution media. Because Media B is removing more contaminant per unit time, its life tends to be shorter than Media A under test conditions. Media C, using both types of nanofiber working in concert, exhibits increasing removal as a function of time for particle sizes 2 μm(c) and smaller, while for larger particles essentially no particles were observed downstream of the filter almost from the beginning of the test.

Figure 8:
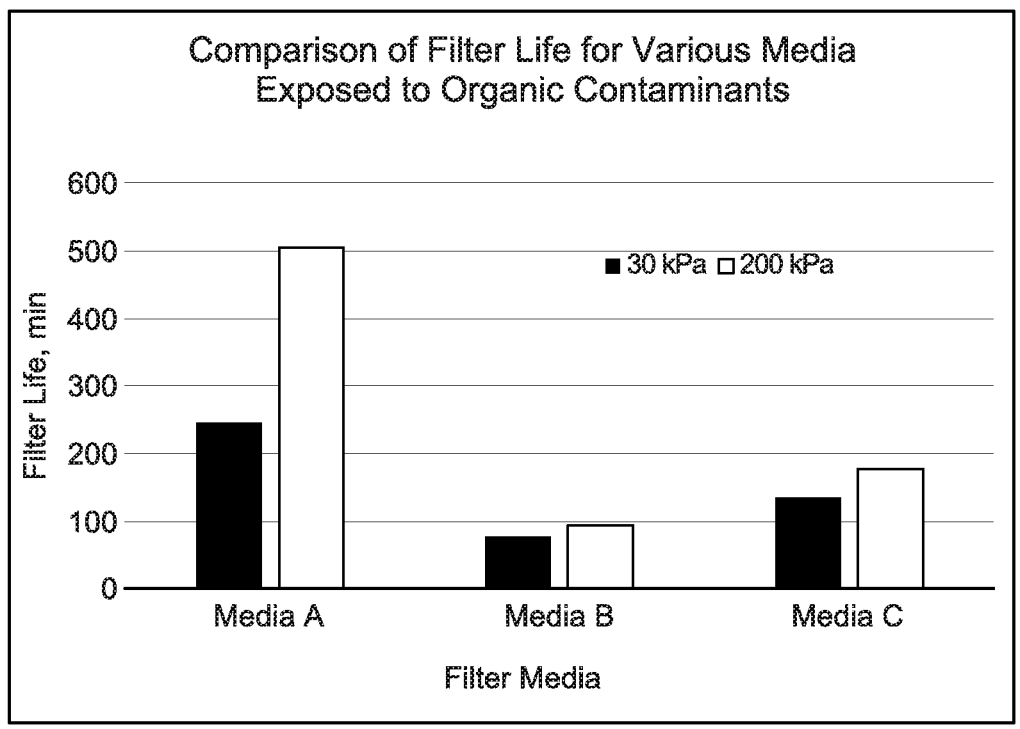
FIG. 8 are bar graphs comparing filter life for each of the Medias A, B and C at an operating pressure of 30 kPa and 200 kPA.
Figure 9:
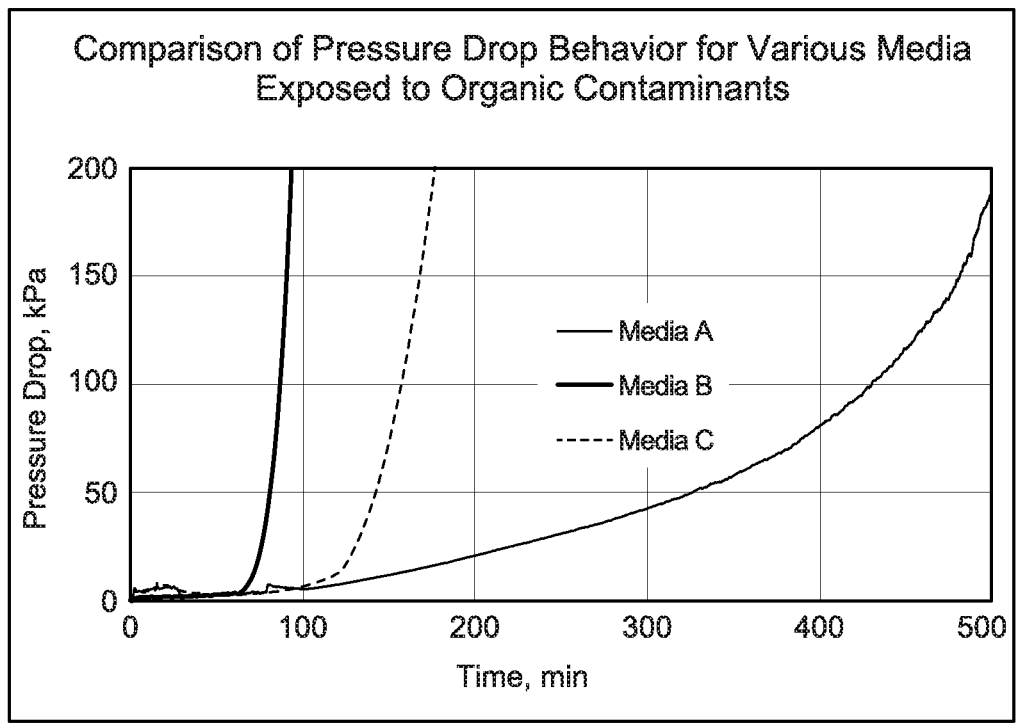
FIG. 9 are plots comparing pressure drop of Medias A, B and C exposed to semi-solid organic contamination.

FIGS. 8-9 illustrate the advantages of the filter media C according to the embodiments described herein, when challenged by organic contaminants, which are abundant in real world applications. The tests used a fuel containing elevated levels of organic contaminants, similar to the contaminants that cause filter plugging in demanding fuel filter applications. The three filters, identical in all aspects except for the filter media, were plumbed in parallel and flow initiated through them at a face velocity of 1.15 cm/min. As such, all three filter were challenged with the same contaminant and concentration at the same face velocity. Pressure drop as a function of time for each filter media was measured. Life was defined in terms of the time required to achieve 30 kPa and 200 kPa, representing different modes of filter usage in actual practice. FIG. 8 illustrates the life of each type of media, A, B and C, at each of the defined terminal pressure drops. FIG. 9 shows the pressure drop behavior of each. These results show that life increases nearly 80% with Media C compared to Media B, while Media C has 35 to 55% of the life of Media A. The near doubling in life with Media C compared to Media B is significant in real world applications. Further, while the life of Media C is shorter than Media A, the longer life of Media A is only obtained at the cost of reduced particle removal efficiency at the particle sizes greater than 2 μm(c), which are known to harm downstream components.

From the above tests, various benefits of the filter media that includes two nanofiber layers as described herein were observed, including: (1) increased removal at all particle sizes over time, this is particularly noteworthy at sizes in the range of 4 μm(c) and larger where removal deteriorated with time for the broad nanofiber diameter distribution media; (2) increased life compared to the narrow nanofiber diameter distribution media and similar life to the broad nanofiber diameter distribution media, despite higher initial restriction and while providing increased removal; (3) removal at all sizes is more constant over the life of the test; (4) elimination of media migration downstream of glass media; (5) avoidance of cracks and breaks in the media at upstream pleat tips, a concern for the broad nanofiber diameter distribution glass media; and (6) reduced thickness compared to the broad nanofiber diameter distribution media that uses multiple layers and a low permeability downstream layer to retain larger particles and prevent media migration.

Filter tests were conducted using various combinations of media layers to demonstrate the benefits of the staged filter media described herein. The physical characteristics of the individual media layers used in these tests are summarized in Table 2 below. The individual media layers in Table 2 are designated by a single letter identifier, i.e., D, E, F, G, H, I, J, and K. Various combinations of upstream and downstream media layers are identified using two letters—the first letter indicates the upstream media layer and the second letter indicates the downstream media layer. Media D, E and F are examples of media that may be used as a downstream staged media layers. Media F, G, H, I, J and K are examples of media that may be used as examples of upstream media layers. Media L is representative of a cellulose layer that may be used to support the upstream and downstream media layers and to facilitate processing and handling of the composite filter media.

understood that where reference is made to P50 herein, the same conclusions and observations apply to the mode pore size. This is contrary to U.S. Pat. No. 10,226,723, which states that in its approach the "mode pore size is larger in the upstream portion than in the downstream portion of the filter media, and the mean (or average) pore size is smaller in the upstream portion than in the downstream portion." The structure of the media in Table 2 and for staged filtration media in general may be maintained by binding the fibers together using phenolic, acrylic or other resin systems, or by thermally bonding the fibers together. Binder fibers are not used, as such may produce a bimodal pore size distribution that provides an undesirable pathway for contaminants to pass through the media uncaptured.

Media D, E, F, J, and K are layers with refractory basis weights less than 5% of the total basis weight. Media D, F and K consist of a single layer of polymeric media, i.e., nylon 6 in the case of media D and F, and polyester in the case of media K. Media E has two sublayers, a thin nylon nanofiber layer supported by media L. The media physical characteristics and filter test data for media E described herein were obtained using this two-layer composite. It is noteworthy, that Media L did not significantly affect the contaminant removal of Media E. The beta ratio at 4 μm(c) using ISO A3 test dust for media E is 3333 while the corresponding value for media L is 2.45. The dust holding capacities for otherwise identical filter elements using media E and L were found to be 27.36 g. The Frazier permeability of media L was 14.5 cfm while the permeability for the

TABLE 2

Physical properties of various media layers
Table 2. Media Physical Properties

| | | | | | | | | | Fiber Diameter | | | |
|---|---|---|---|---|---|---|---|---|---|---|---|---|
| | | Pore Size | | | | Frazier | | Basis weight | | Upstream | | Downstream |
| Media Layer | P50 μm | Mode μm | P99 μm | Maximum μm | P99/P50 | permeability cfm | Thickness mm | Total g/m² | Refractory g/m² | Geometric mean μm | Geometric standard deviation | Geometric mean μm | Geometric standard deviation |
| D | 2.64 | 2.65 | 3.73 | 5.36 | 1.41 | 5.8 | 0.12 | 20 | 0.32 | 0.27 | 1.61 | — | — |
| E | 2.59 | 2.61 | 3.64 | 5.06 | 1.41 | 6.7 | 0.56 | 128 | 3.58 | 0.31 | 1.28 | 13.39 | 1.67 |
| F | 6.07 | 6.06 | 6.83 | 11.46 | 1.13 | 20.1 | 0.20 | 29.3 | 0.51 | 0.63 | 1.89 | — | — |
| G | 2.46 | 2.46 | 6.64 | 6.89 | 2.70 | 6.7 | 0.53 | 90 | 83.70 | 0.87 | 2.46 | 0.25 | 2.66 |
| H | 8.00 | 7.93 | 18.91 | 24.28 | 2.36 | 17.4 | 0.81 | 120 | 87.12 | 1.49 | 2.72 | 0.66 | 2.43 |
| I | 4.43 | 4.39 | 11.95 | 16.02 | 2.70 | 8.2 | 0.46 | 80 | 71.68 | 1.60 | 2.26 | 0.34 | 2.27 |
| J | 12.79 | 12.78 | 18.61 | 21.46 | 1.46 | 38 | 0.47 | 65 | 0.16 | 8.20 | 1.14 | 1.59 | 1.58 |
| K | 11.14 | 11.14 | 18.27 | 26.37 | 1.64 | 25 | 0.4191 | 52 | 0.08 | 0.80 | 2.88 | — | — |
| L | 8.79 | 8.37 | 26.37 | 33.49 | 3.00 | 14.5 | 0.7112 | 114 | 3.96 | 13.39 | 1.67 | — | — |

Figure 10:
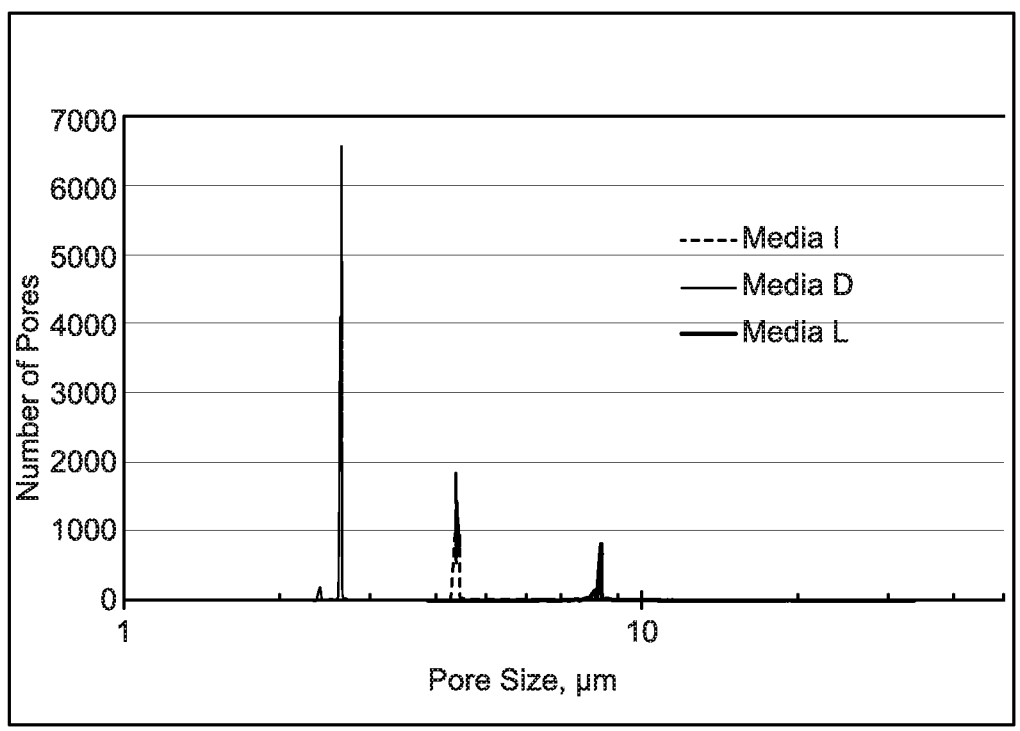
FIG. 10 are plots of pore size vs number of pores of an upstream first media layer formed from a refractory material (Media I), a downstream media layer formed from a polymeric material (Media D), and a support media layer (Media L).

FIG. 10 illustrates the pore size distribution for exemplary upstream (Media I), downstream (media D) and support media (media L) layers. Values for P50, the mode pore size, P99, maximum pore size, and P99/P50 ratio are shown in in Table 2. In defining the characteristics of the various media layers described herein, P99 and the P99/P50 ratio is used rather than the maximum pore size, as P99 is a more statistically sound characteristic and, in contrast to the maximum or max pore size, is less susceptible to media damage.

All of the media in Table 2 exhibit essentially monomodal pore size distribution with values for the P50 and mode pore size essentially the same within the limits of experimental error. As a result of the essential equivalence of P50 (mean flow pore size) and the mode pore size, it should be media E nanofiber layer alone was calculated to be 12.5 cfm, approximately the same as the support layer (e.g., within +16% of the support layer).

Media J is a multilayer, meltblown polyester used in gradient density filters. Media G, H and I are composed of two or more sublayers of glass media, in which at least one sublayer, typically the downstream most layer, has a geometric mean fiber diameter less than 1 μm and geometric standard deviation greater than 2. The refractory basis weight of these media is greater than 70% of the total basis weight of the media. The non-refractory portion of the basis weight consists primarily of resins and binders used to hold the glass fibers in place during processing, handling and use.

Figure 11:
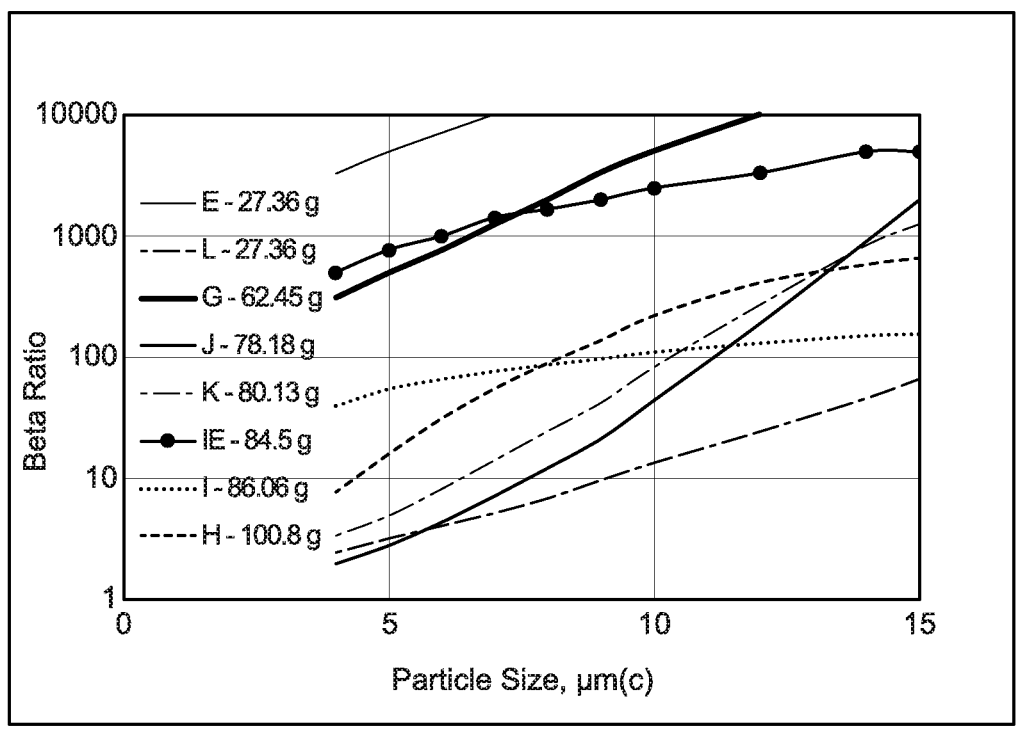
FIG. 11 are plots of particle size vs beta ratio of various filter media determined using an ISO A3 test dust particles suspended in MIL-PRF-5606 hydraulic oil.

To establish baseline performance under standardized test conditions, multi-pass tests were conducted as per ISO 16889 using ISO A3 test dust for Media E, G, H, I, J, K, L and IE. The results are shown in FIG. 11. Media G, H, I, J and K were used as upstream media layers in subsequent tests. Media E is only used as a downstream media layer and Media L as a support layer. A comparison of media E, IE and L is noteworthy. Media IE is a gradient density media. As expected, it exhibits greater capacity than media E, however, contaminant removal is lower for the composite media. This is due to filling in of the finer pores of the upstream media layer by larger particles and the corresponding relative increase in flow rate through larger, less efficient pores. Media E is a reverse gradient density media, i.e., a fine nanofiber layer upstream of a coarse downstream layer of Media L. Gradient density filtration teaches that this should shorten life compared to Media L. Instead, nearly the same dust holding capacity for Media E and L are observed and even though removal for Media E is approximately 1000 times greater al all particle sizes.

Figure 12:
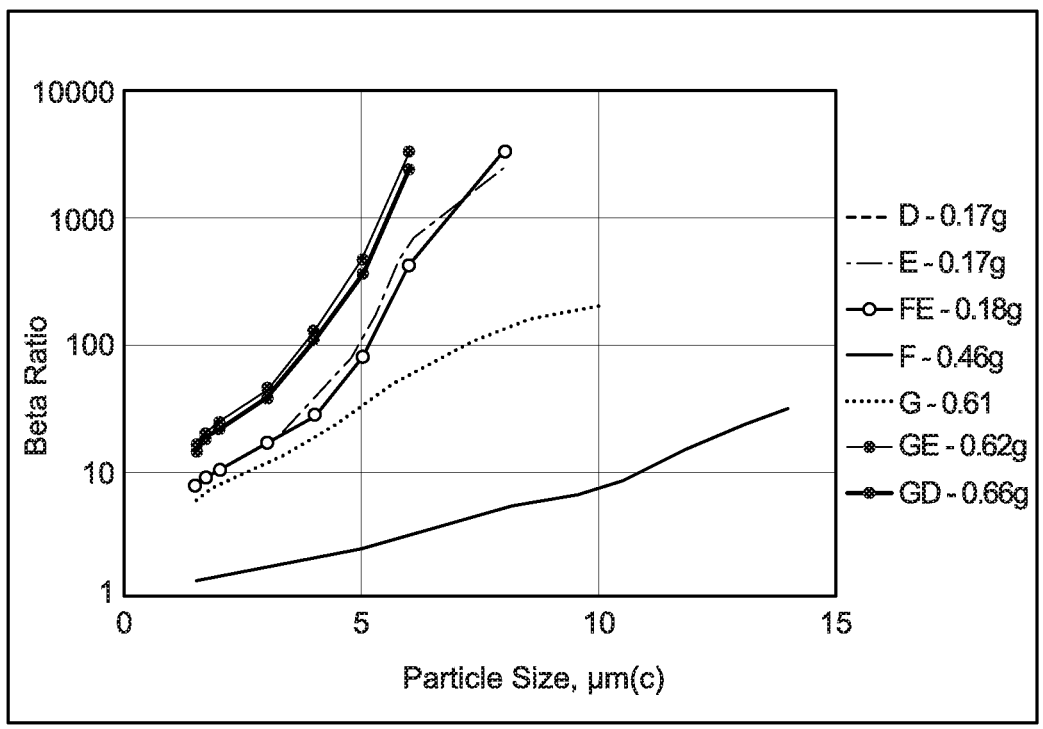
FIG. 12 are plots of particle size vs beta ratio of various filter media using 0-5 μm(c) test dust suspended in MIL-PRF-5606 hydraulic oil.

A series of multi-pass tests were conducted as per ISO 16889 using PTI 0-5 μm test dust with various media to demonstrate the benefits and limitations of the staged filtration media according to the embodiments described herein in comparison to gradient filtration for the removal of hard, abrasive particle under more realistic conditions than are obtained using ISO A3 test dust. Media D, GD, E, FE, GE, F, and G were tested. The results are shown in FIG. 12. Among these media, it is significant that media FE is an example of a gradient density filter, while GD and GE are embodiments of staged filtration.

A comparison of the results for media E, FE, and GE illustrate the advantages of staged filtration compared to gradient density filtration. All three tests utilize media E as the downstream layer. Media FE utilized gradient density filtration to obtain a 6% increase in capacity compared to the base media E, without significantly affecting contaminant removal. Media GE, with larger downstream fiber diameter and P50 than the upstream layer, contrary to gradient density filtration, is an example of staged filtration and yields more than triple the capacity and approximately twice the beta ratio as the base media E or the gradient density media FE. A comparison of media D and GD demonstrate similar unexpected benefits for staged filtration. GD exhibits a slightly smaller fiber diameter and pore size in the upstream layer, contrary to the teachings of gradient filtration, yet yields essentially the same beta ratio as the base media D, but nearly four times greater capacity.

These results demonstrate the unexpected benefits of staged filtration over gradient density filtration for the removal of hard, abrasive particles for nanofiber filter media. These benefits are in part the result of the: (1) use of a downstream media layer composed of nanofiber with geometric fiber diameter less than 1 μm; (2) use of media layers with geometric mean fiber diameter and/or P50 that are not too disparate; (3) use of media layers with fiber diameter and/or pore size distribution that complement one another, i.e., broader fiber diameter and/or pore size distribution layer upstream of a narrower fiber diameter and/or pore size distribution layer; and (4) Frazier permeability of the downstream media layer ideally greater than the upstream media layer.

A series of tests using organic contaminants were conducted to demonstrate the benefits of the stage filter media described herein relative to gradient density filter under conditions simulating field usage. The same test organic contamination test method previously described herein was used, except that 6 (instead of 3) different filter media holders were used to simultaneously test 6 different filter media at a face velocity of 1.00 cfm. The 6 media were thus tested under identical conditions to facilitate direct comparison of filter life. In each series of tests, the normalized filter life for a particular media was calculated by dividing the time required for the media to achieve a pressure drop of 200 kPa divided by the time required for downstream layer alone (no upstream layer) to reach the same pressure drop for the same set of tests.

Each series of 6 filter media was replicated with the media in different filter media holders and the average normalized filter life and standard deviation for each media. In the case of media F (no upstream layer), no standard deviation is given as this test was not replicated due to mechanical failure of a test system component and relative filter life for this series was calculated using the single media F test data that was available. Media layers D, E, F, G, H, I, J and K were used in the various combinations for these tests. One series of tests each, using media D, E, or F as the downstream layer were conducted with media F, G, H, I, J or K as the upstream layer.

The results of these tests are shown in Table 3. In the table, the test series is indicated with the designation of the downstream media. The filtration mode refers to the type of filter media design for the indicated media, whereby: (1) "reference" refers to a single media layer, which is the same media as was used as the downstream media for the indicated test series; (2) "gradient density" refers to media in which the upstream layer has greater geometric mean fiber diameter, P50 and Frazier permeability than the downstream layer; and (3) "staged" refers to media in which the upstream layer, compared to the downstream layers, has smaller than or similar sized geometric mean fiber diameter and P50 and/or Frazier permeability. The relative filter for each of the replicates, their mean and standard deviation are also shown.

TABLE 3

Simulated Organic Loading Test

| Test Series | Media | Filtration mode | Relative Filter Life | | | |
| --- | --- | --- | --- | --- | --- | --- |
| | | | Test 1 | Test 2 | Mean | Standard deviation |
| D | D | Reference | 1.00 | 1.00 | 1.00 | 0.03 |
| | FD | Gradient density | 0.90 | 0.98 | 0.94 | 0.03 |
| | JD | Gradient density | 0.73 | 0.88 | 0.80 | 0.09 |
| | GD | Staged | 1.54 | 2.13 | 1.82 | 0.36 |
| | ID | Gradient density | 1.66 | 1.57 | 1.61 | 0.11 |
| | HD | Gradient density | 0.56 | 0.67 | 0.61 | 0.07 |
| E | E | Reference | 1.00 | 1.00 | 1.00 | 0.20 |
| | FE | Gradient density | 0.94 | 1.54 | 1.20 | 0.18 |
| | JE | Gradient density | 0.98 | 0.98 | 0.98 | 0.20 |
| | GE | Staged | 2.61 | 3.52 | 3.00 | 0.05 |
| | IE | Gradient density | 1.35 | 2.26 | 1.74 | 0.29 |
| | HE | Gradient density | 0.98 | 1.28 | 1.11 | 0.01 |
| F | F | Reference | 1.00 | | 1.00 | |
| | KF | Gradient density | 1.89 | 1.91 | 1.90 | 0.01 |
| | JF | Gradient density | 1.65 | 1.60 | 1.63 | 0.04 |
| | GF | Staged | 1.34 | 1.37 | 1.35 | 0.02 |
| | IF | Staged | 1.78 | 1.97 | 1.88 | 0.14 |
| | HF | Gradient-Staged | 2.58 | 2.32 | 2.45 | 0.18 |

Referring to test series D, Media FD, JD, ID, and HD, these are examples of gradient density filtration. Relative filter life for gradient density media ranged from 0.61 for Media HD to 1.61 for media ID. The short relative life with Media HD and JD reflects behavior when an upstream media layer is used that is too open and permeable relative to the downstream media layer, and reflects a special challenge when attempting to apply gradient density filtration to nanofiber filter media. Media FD and HD represent better application of gradient density filtration, but Media GD, staged filtration, exhibits the highest mean relative filter life, even though the upstream media layer has slightly smaller geometric mean fiber diameter and P50. The benefit comes, in part, from the use of a broad fiber diameter distribution (reflected by geometric mean standard deviation) and broader pore size distribution (reflected in the P99/P50 ratio) media upstream of a narrow fiber diameter and pore size distribution. Note, the broader distribution alone does not yield these benefits, as gradient density Media HD and ID both exhibit such distribution behavior, but do not experience the benefit.

The results for test series E are consistent with those of test series D. Media FE, JE, IE, and HE are examples of gradient density filtration. Relative filter life for gradient media ranged from 0.98 for Media JE to 1.74 for media IE. In contrast, staged Media GE yielded a relative filter life of 3.00. Media HE and IE both exhibit broad fiber diameter and pore size distributions in a gradient density media, but do not demonstrate the gains in relative filter life observed with staged filtration whereby the upstream layer has smaller geometric mean fiber diameter and P50 than the downstream layer.

The results for test series F provide reveal enlightening details. Media JF and KF are examples of gradient density filtration and exhibit increased relative filter lives of 1.63 and 1.90, respectively. Media GF and IF are examples of staged filtration and exhibit increase relative filter lives of 1.35 and 1.88, respectively. Media HF exhibits characteristics of both gradient density and staged filtration and exhibits a relative filter life of 2.45. From the perspective of P50, it appears to be gradient density media, however, unlike gradient density filtration, the geometric filter diameter of the Media HF upstream layer is statistically the same as the downstream layer. More revealing, the upstream Frazier permeability of Media HF is lower than the downstream Frazier, i.e., the upstream is more restrictive and tighter counter to gradient density filtration.

The results of Media HF, along with the previous data using Media G and I as the upstream media, suggest that it is desirable that the upstream Frazier permeability be similar to or less than the downstream Frazier permeability. More specifically, the results suggest that the greatest increases in relative life occur when the ratio of the upstream Frazier permeability to the downstream Frazier permeability is less than 2.0, i.e., Media GF, IF, HF, GE, GD, IE, KF, ID, and JF all yield relative life in excess of 1.6. Further, among these those that exhibit the geometric mean fiber diameter, geometric standard deviation for fiber diameter, and high P99/P50 of staged filtration all exhibit relative life in excess of 1.8). The Media HF data further suggests that gradient density and staged filtration can be used together to increase relative filter life.

As has been shown, the properties of the upstream and downstream layers are desirably selected to complement one another to achieve the benefits of the staged filter media described herein. The values of the ratio of the upstream to downstream geometric mean fiber diameter, P50, and Frazier permeability are critical. If the value of these ratios is too great, the upstream layer will be ineffective in contaminant loading and fail to protect the downstream layer. If the value is too small, the upstream layer becomes the main filtration layer and filter life is greatly reduced.

Figure 13:
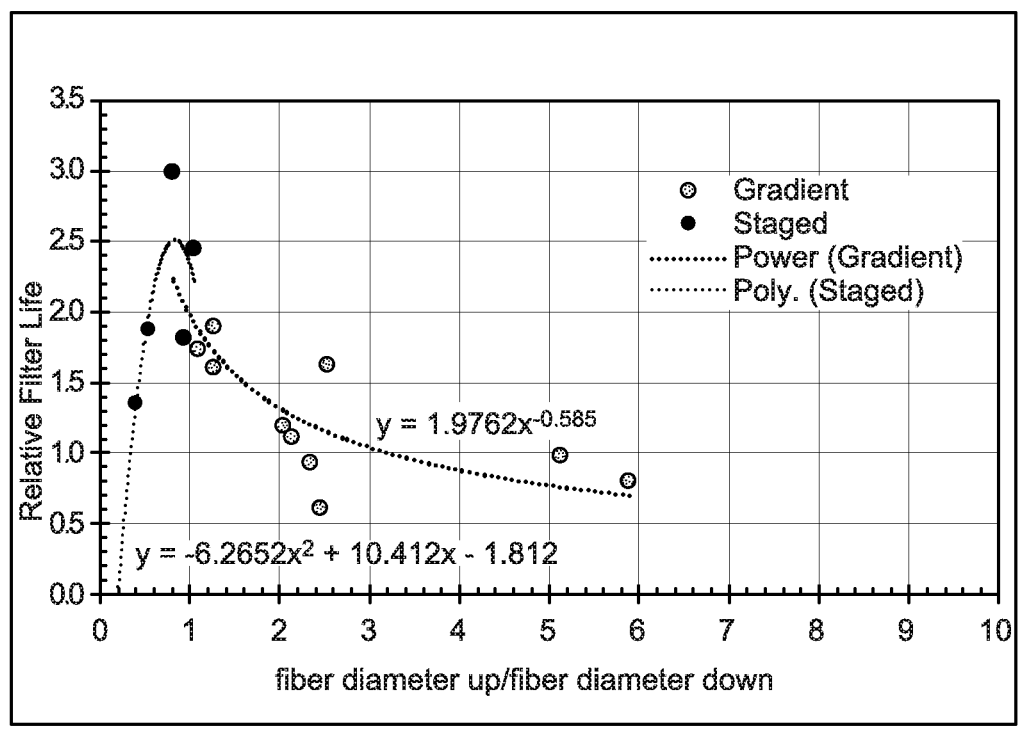
FIG. 13 are plots demonstrating the effect of a ratio of the geometric mean fiber diameter of an upstream first media layer to the geometric mean fiber diameter of a downstream second media layer on relative filter life for a gradient media, and the staged media according to the various embodiments described herein.
Figure 14:
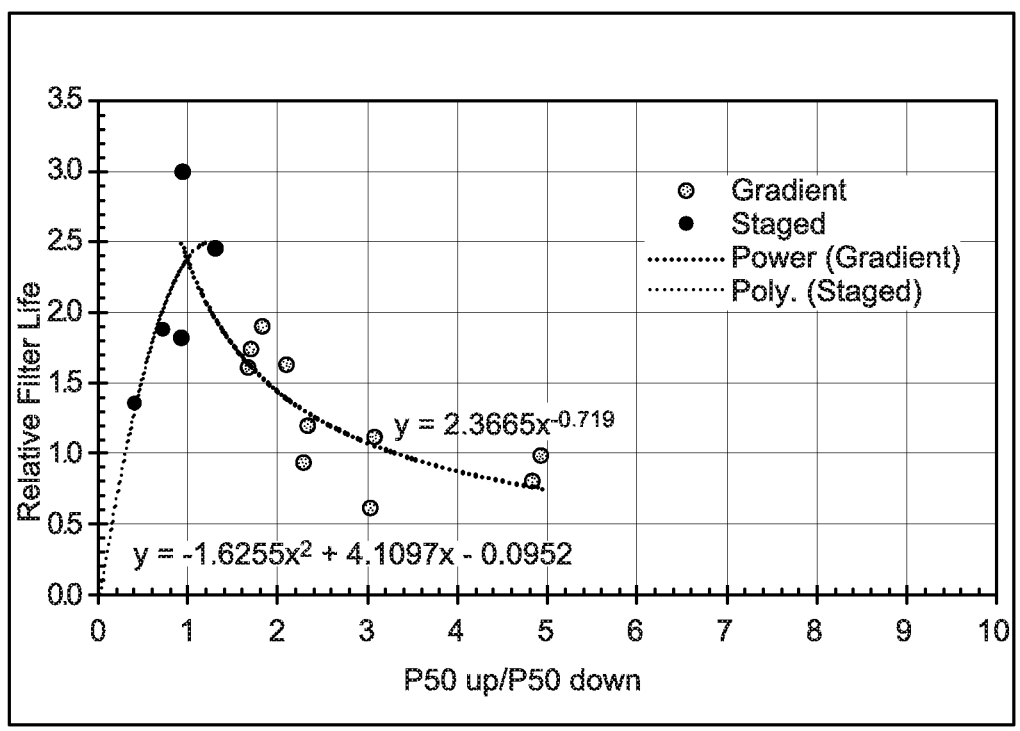
FIG. 14 are plots demonstrating the effect of a ratio of the P50 of an upstream first media layer to the P50 of a downstream second media layer on relative filter life for a gradient media, and the staged media according to the various embodiments described herein.
Figure 15:
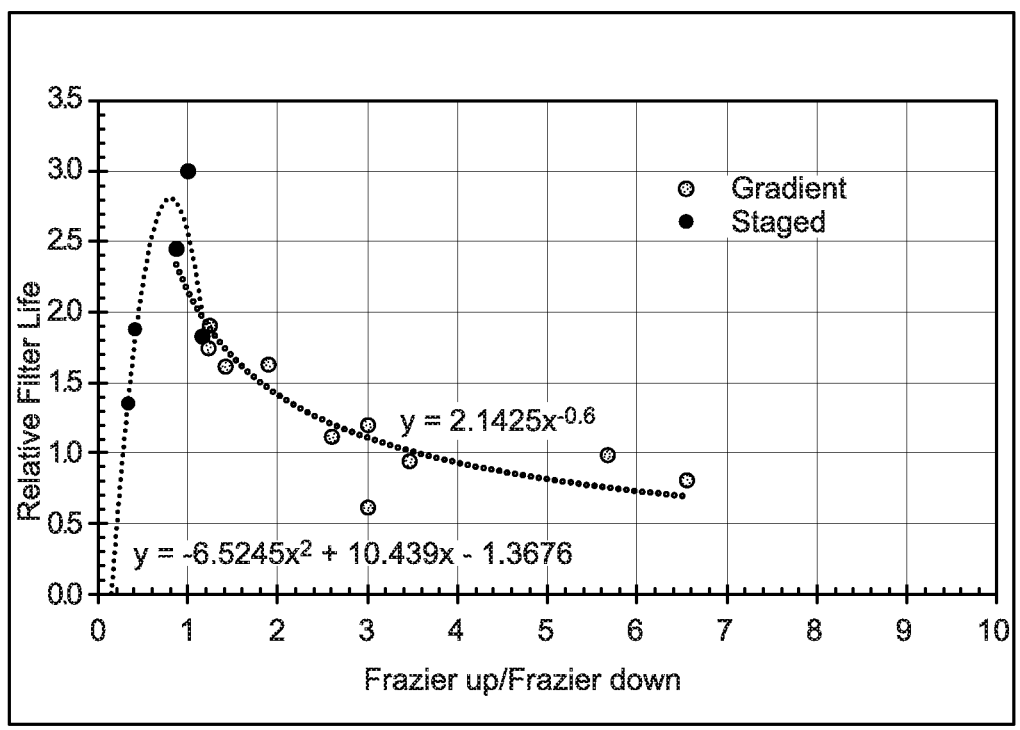
FIG. 15 are plots demonstrating the effect of a ratio of the Frazier permeability of an upstream first media layer to the Frazier permeability of a downstream second media layer on relative filter size for a gradient media, and the staged media according to the various embodiments described herein.

To determine the optimal ranges of these values, plots of relative filter life from the organic contamination tests as a function of the corresponding ratios are shown in FIGS. 13-15. To determine the maximum value for each ratio, all data from Table 3 with ratios values greater than or equal to that of Media GE were curve fitted to a power function. Using the function determined in this manner, the value for the ratio that yields a relative filter life of 1.25 was calculated. This corresponds to the maximum value of the ratio (upstream to downstream geometric mean fiber diameter ratio, P50 ratio, or Frazier permeability ratio) that yields significant increase in filter life. Similarly, to determine the minimum value for each ratio, the data for all staged filtration media were curve fitted to a second order polynomial function and the resultant function used to determine the minimum value of the ratio that yields a relative filter life of 1.25. This corresponds to the minimum of the ratio (upstream to downstream geometric mean fiber diameter ratio, P50 ratio, or Frazier permeability ratio) that yields significant increase in filter life.

Using these methods, it was determined that the desired ranges of these ratios to achieve greater than 25% increased relative filter are: (1) 0.4<upstream to downstream geometric mean fiber diameter ratio<2.2; (2) 0.4<upstream to downstream P50 ratio<2.5; and/or (3) 0.3<upstream to downstream Frazier permeability ratio<2.5. Preferably, the desired ranges of these ratios are: (1) 0.4<upstream to downstream geometric mean fiber diameter ratio<2; (2) 0.4<upstream to downstream P50 ratio<2; and (3) 0.4<upstream to downstream Frazier permeability ratio<2. Ideally, the maximum value for all three ratios is less than or equal to 1.

It has been found that suitable upstream filter media layers tend to be composed of glass fibers bonded together with resin, however, in some embodiments polymeric media with similar physical properties are anticipated. Suitable downstream filter media layers tend to be composed of polymeric nanofibers (geometric mean fiber diameter less than 1 µm), produced by electrospinning, electroblowing, meltblowing, or other processes, or nanofibers composed of other materials, such as carbon nanofibers, are envisioned in other embodiments. It should be noted that the properties of filter media exhibit an inherent degree of variability by virtue of the material and processes used in their product, as well as experimental error in measuring these properties.

Figure 16A:
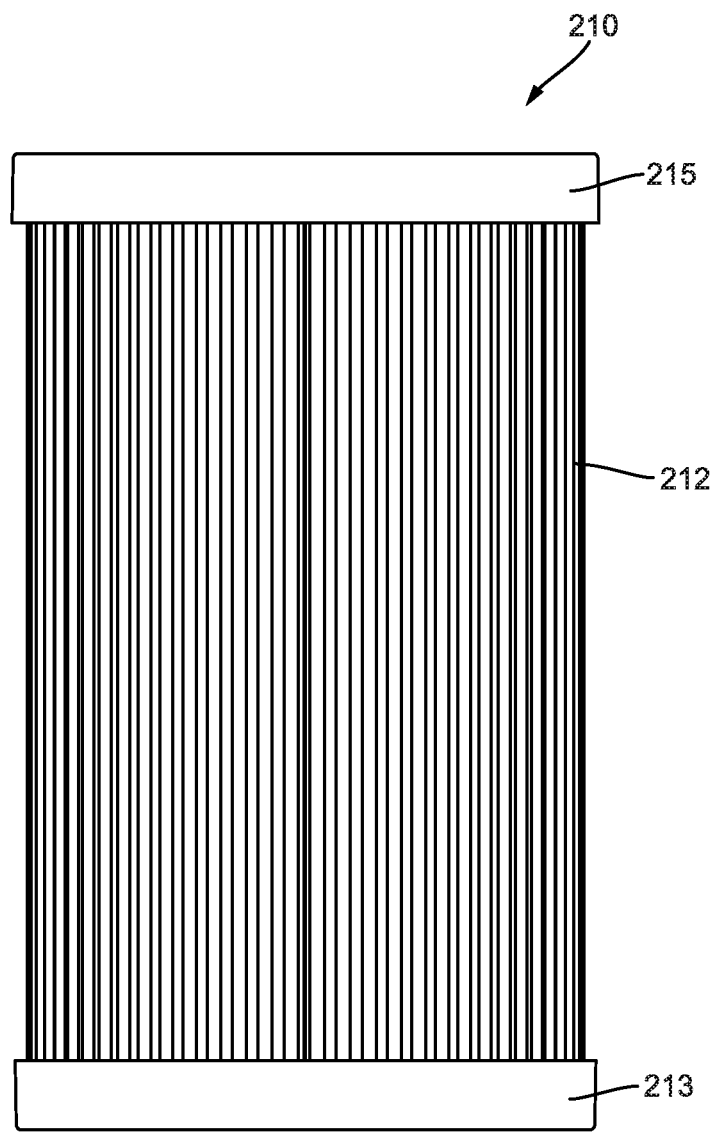
FIG. 16A is a side view of a filter element, according to an embodiment.
Figure 16B:
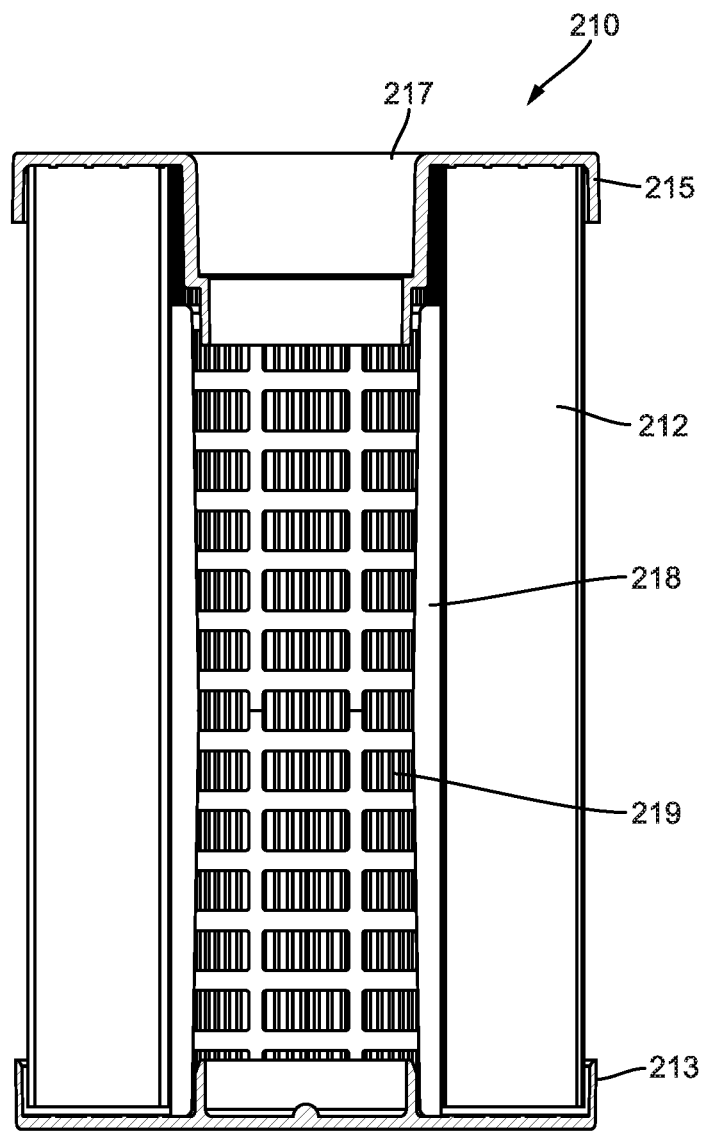
FIG. 16B is a side cross-section view of the filter element of FIG. 16A.

In some embodiments, the filter media 100 or any other filter media described herein may be included in a filter element configured to filter any fluid, for example, lube (e.g., hydraulic fluid, lubricating oil, hydraulic oil, diesel fuel, etc.), air, air/fuel mixture, water, etc., in applications such as aerospace, power generation, power transmission, fuel cells, water filtration, and other industrial applications. Referring now to FIGS. 16A-16B, a filter element 200 is shown, according to an embodiment. The filter element 210 includes a filter media 212, which may include the first fiber layer 102, the second fiber layer 104, and any other filter media layers arranged in any suitable configuration, as previously described herein.

In some embodiments, the filter media 212 may be pleated such that the filter media 212 is arranged in a pleated media pack. In other embodiments, the filter media 212 may be corrugated or folded. A first end cap 213 is coupled to a first end of the filter media 212 and a second end cap 215 is coupled to a second end of the filter media 212 opposite the first end. A center tube 218 is disposed within the filter media 212 and defines a central channel to allow fluid to flow therethrough to a second end cap opening 217 defined in the second end cap 215, or receive fluid from the second end cap opening 217. A plurality of perforations, pores or openings 219 are defined in the center tube 218 to allow fluid being filtered through the filter media 212 to enter the central channel, or to allow unfiltered fluid to enter the filter media 212.

Figure 17:
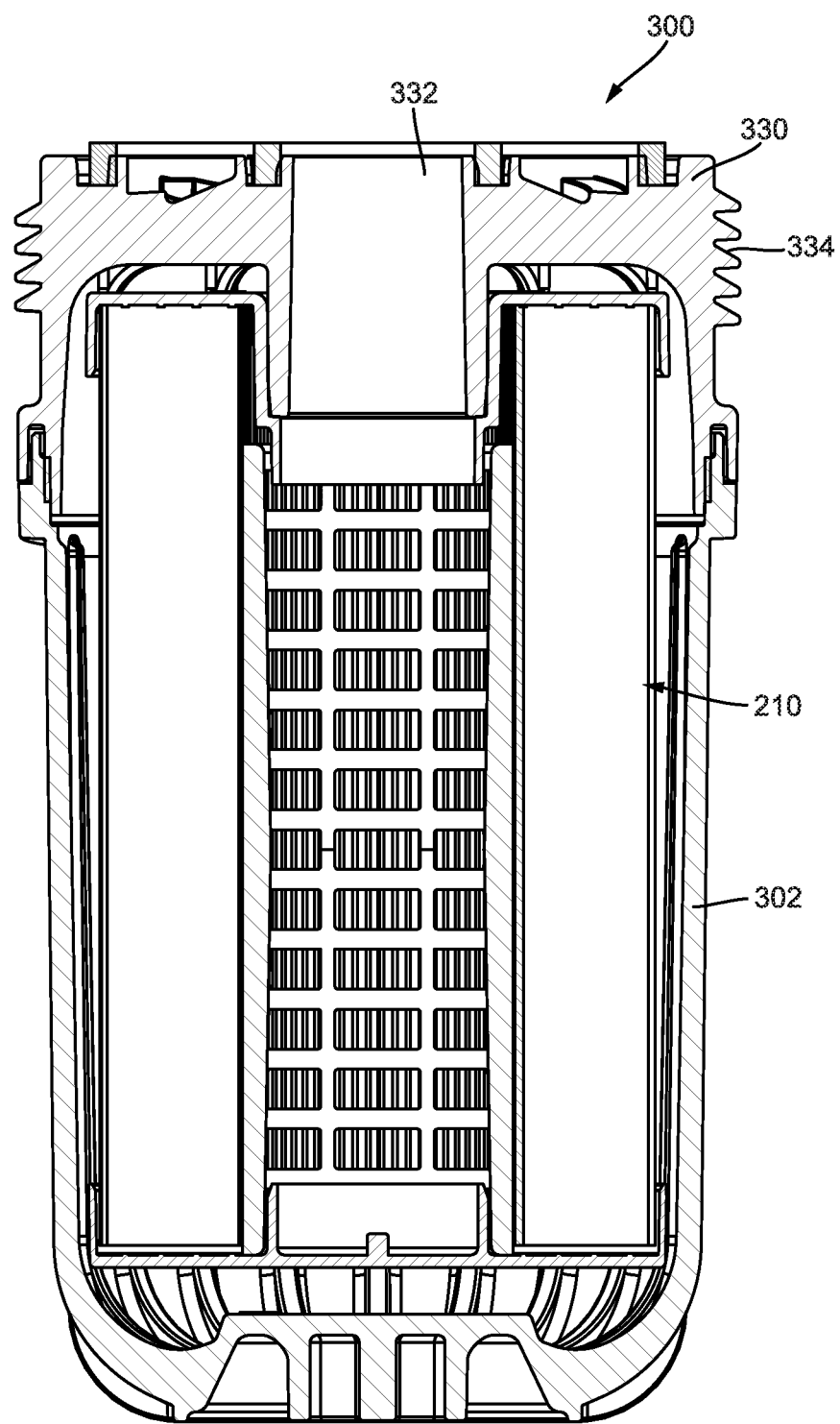
FIG. 17 is a side cross-section view of a filter assembly including the filter element of FIG. 16A-B, according to an embodiment.

In some embodiments, the filter element 210 may be included in a filter assembly, for example, a spin-on filter assembly. For example, FIG. 17 is a side cross-section view of a filter assembly 300, according to an embodiment. The filter assembly 300 includes a housing 302 defining an internal volume within which the filter element 210 is disposed. The housing 302 may include a shell housing. A cover 330 is coupled to an end of the housing proximate to the second end cap 215 of the filter element 212. The cover 330 may include a nut plate that may be coupled to the housing via friction fit mechanism, a snap-fit mechanism, mating threads, or any other suitable coupling mechanism. The cover 330 defines a cover opening 332 that is in fluid communication with the second cap opening to allow fluid communication therethrough. Threads 334 are defined on an outer surface of the cover 330, and configured to allow the filter assembly 300 to be removably coupled to a filter head, for example, spun-on the filter head.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter media for use in a filter element, comprising:
a first fiber layer;
a second fiber layer positioned downstream of the first fiber layer, the first fiber layer having a first geometric mean fiber diameter of less than 1 µm, a first geometric standard deviation of fiber diameter greater than 2.0, and a first pore size distribution corresponding to a first P99/P50 ratio, the first P99/P50 ratio based on a first mean flow pore size P50 of less than 3 µm, and the second fiber layer having a second geometric mean fiber diameter of less than 1 µm, a second geometric standard deviation of fiber diameter less than or equal to 2.0, and a second pore size distribution corresponding to a second P99/P50 ratio, the second P99/P50 ratio based on a second mean flow pore size P50 of less than 10 µm, wherein the second P99/P50 ratio is less than the first P99/P50 ratio, wherein the first P99/P50 ratio is greater than 3 and the second P99/P50 ratio is less than 2, wherein the first fiber layer comprises nanofibers in a first amount and microfibers in a second amount that is less than the first amount, and wherein a ratio of a first Frazier permeability of the first fiber layer to a second Frazier permeability of the second fiber layer is within a range of 0.3 and 2.0, inclusive; and
a substrate positioned downstream of the second fiber layer such that the second fiber layer is disposed between the first fiber layer and the substrate, the substrate comprising coarser fibers than each of the first fiber layer and the second fiber layer and having a third geometric mean fiber diameter of larger than 1 µm.

2. The filter media of claim 1, wherein a ratio of the first geometric mean fiber diameter to the second geometric mean fiber diameter is within a range of 0.4 and 2.2, inclusive.

3. The filter media of claim 2, wherein the first geometric mean fiber diameter of the first fiber layer is less than or equal to the second geometric mean fiber diameter of the second fiber layer.

4. The filter media of claim 1, wherein between 2% and 20% by number of fibers included in the first fiber layer have a diameter larger than 1 µm.

5. The filter media of claim 1, wherein less than 15% by number of fibers included in the second fiber layer have a diameter larger than 1 µm.

6. The filter media of claim 1, wherein the first fiber layer comprises a refractory material.

7. The filter media of claim 6, wherein the nanofibers have a length within a range of 1 mm and 30 mm, inclusive.

8. The filter media of claim 6, wherein greater than 50% of a mass of the first fiber layer comprises the refractory material.

9. The filter media of claim 6, wherein the second fiber layer comprises a polymeric material.

10. The filter media of claim 1, wherein the first mean flow pore size P50 of the first fiber layer is equal to or less than the second mean flow pore size P50 for the second fiber layer.

11. The filter media of claim 1, wherein the first fiber layer further comprises a phenolic resin for bonding the nanofibers and the microfibers.

12. The filter media of claim 1, wherein the second fiber layer comprises continuous polymeric fibers.

13. The filter media of claim 1, wherein each of the first fiber layer and the second fiber layer has a monomodal pore size distribution.

14. The filter media of claim 1, wherein the first fiber layer has a first Frazier permeability of less than 20 cfm, and the second fiber layer has a second Frazier permeability greater than 5 cfm.

15. The filter media of claim 14, wherein the first Frazier permeability of the first fiber layer is less than 10 cfm.

16. The filter media of claim 14, wherein the nanofibers and the microfibers comprise a refractory material, and wherein the second fiber layer comprises continuous polymeric fibers.

17. The filter media of claim 1, wherein:
the second fiber layer comprises continuous polymeric fibers; and
the first fiber layer and the second fiber layer are bonded to one another by one of thermal, sonic, chemical, or mechanical bonding.

18. The filter media of claim 1, further comprising a spun-bound layer positioned upstream of the first fiber layer such that the first fiber layer and the second fiber layer are disposed between the spun-bound layer and the substrate.

19. The filter media of claim 1, wherein the substrate comprises cellulose fibers or polymeric fibers.

\* \* \* \* \*